United States Patent
Akiyama

(10) Patent No.: US 11,556,051 B2
(45) Date of Patent: Jan. 17, 2023

(54) ILLUMINATOR AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/338,088

(22) Filed: Jun. 3, 2021

(65) Prior Publication Data

US 2021/0382381 A1   Dec. 9, 2021

(30) Foreign Application Priority Data

Jun. 4, 2020   (JP) .............................. JP2020-097822

(51) Int. Cl.
G03B 21/20   (2006.01)
G03B 33/12   (2006.01)

(52) U.S. Cl.
CPC ....... G03B 21/204 (2013.01); G03B 21/2066 (2013.01); G03B 33/12 (2013.01)

(58) Field of Classification Search
None
See application file for complete search history.

(56) References Cited

U.S. PATENT DOCUMENTS

| | | | |
|---|---|---|---|
| 2016/0061391 A1* | 3/2016 | Inoue | ............... F21V 5/005 362/84 |
| 2016/0370696 A1 | 12/2016 | Akiyama | |
| 2017/0153538 A1 | 6/2017 | Kawasumi | |
| 2018/0210211 A1 | 7/2018 | Akiyama | |
| 2018/0373132 A1 | 12/2018 | Miyazaki | |

FOREIGN PATENT DOCUMENTS

| | | | | |
|---|---|---|---|---|
| CN | 104765239 A | * | 7/2015 | |
| JP | 2011128522 A | * | 6/2011 | |
| JP | 2015-040892 A | | 3/2015 | |
| JP | 2016-194699 A | | 11/2016 | |
| JP | 2017-009683 A | | 1/2017 | |
| JP | 2017-097310 A | | 6/2017 | |
| JP | 2017-194523 A | | 10/2017 | |
| JP | 2018-120111 A | | 8/2018 | |
| JP | 2019-008193 A | | 1/2019 | |
| WO | WO-2017061227 A1 | * | 4/2017 | ............... F21S 2/00 |

* cited by examiner

Primary Examiner — Bao-Luan Q Le
Assistant Examiner — Danell L Owens
(74) Attorney, Agent, or Firm — Oliff PLC

(57) ABSTRACT

An illuminator includes a light emitting apparatus which outputs first light belonging to a first wavelength band, a wavelength converter which converts part of the first light into second light belonging to a second wavelength band and causes the second and remainder of the first light to exit, a first optical system with positive power and which the first light enters, an optical element which the remaining first light enters and which reflects either the first or second light and transmits the other, a second optical system with positive power and which the first from the optical element and second light from the converter enter, a third optical system with positive power and causes the first light from the second optical system to enter the converter, and a fourth optical system with positive power and which the second light from the second optical system enters.

14 Claims, 13 Drawing Sheets

ILLUMINATOR AND PROJECTOR

The present application is based on, and claims priority from JP Application Serial Number 2020-097822, filed Jun. 4, 2020, the disclosure of which is hereby incorporated by reference herein in its entirety.

BACKGROUND

1. Technical Field

The present disclosure relates to an illuminator and a projector.

2. Related Art

As a light source apparatus used in a projector, there has been a proposed light source apparatus using fluorescence emitted from a phosphor when the phosphor is irradiated with excitation light outputted from a light emitter.

JP-A-2017-194523 discloses a light source apparatus including light sources that each output blue excitation light, a wavelength converter that converts the excitation light into fluorescence, a dichroic mirror that reflects the excitation light and transmits the fluorescence, and a focusing lens unit that guides the excitation light having exited out of the dichroic mirror to the wavelength converter.

JP-A-2019-8193 discloses a light source apparatus including a first light source that outputs excitation light, a second light source that emits fluorescence when irradiated with the excitation light, a dichroic mirror that reflects the excitation light and transmits the fluorescence. In the light source apparatus described above, a microlens array and an adjustment lens that adjusts the cross-sectional shape of a luminous flux are provided between the laser light source that outputs excitation light and the dichroic mirror.

In the light source apparatus disclosed in JP-A-2017-194523, when the dichroic mirror is larger than the luminous flux width of the excitation light having exited out of the wavelength converter, a large portion of the excitation light is reflected off the dichroic mirror and returns toward the light sources, resulting in a problem of a decrease in the proportion of the blue light used as illumination light. In the light source apparatus disclosed in JP-A-2017-194523, however, a first lens array and a second lens array are provided between the light sources and the dichroic mirror, so that the excitation light is diffused. Therefore, on one hand, the two lens arrays homogenize the excitation light distribution on the wavelength converter, but on the other hand, it is difficult to reduce the size of the dichroic mirror.

Similarly, in the light source apparatus disclosed in JP-A-2019-8193, the microlens array is provided between the laser light source and the adjustment lens, so that the excitation light is diffused. Therefore, on one hand, the microlens array homogenizes the excitation light intensity distribution on the phosphor, but on the other hand, it is difficult to reduce the size the dichroic mirror. It is therefore difficult to reduce the size of the dichroic mirror and suppress the decrease in the excitation light utilization efficiency in the light source apparatuses disclosed in JP-A-2017-194523 and JP-A-2019-8193.

SUMMARY

To solve the problems described above, an illuminator according to an aspect of the present disclosure includes a light emitting apparatus which outputs first light that belongs to a first wavelength band, a wavelength converter which converts part of the first light into second light that belongs to a second wavelength band different from the first wavelength band and causes the second light and another part of the first light to exit, a first optical system which has positive power and which the first light enters, an optical element which the first light that exits out of the first optical system enters and which reflects one of the first light and the second light and transmits another of the first light and the second light, a second optical system which has positive power and which the first light that exits out of the optical element and the second light emitted from the wavelength converter enter, a third optical system which has positive power and causes the first light that exits out of the second optical system to enter the wavelength converter, and a fourth optical system which has positive power and which the second light that exits out of the second optical system enters.

A projector according to another aspect of the present disclosure includes the illuminator according to the aspect of the present disclosure, a light modulator that modulates light from the illuminator in accordance with image information, and a projection optical apparatus that projects the light modulated by the light modulator.

DESCRIPTION OF EXEMPLARY EMBODIMENTS

First Embodiment

A first embodiment of the present disclosure will be described below with reference to FIGS. 1 to 4.

In the following drawings, components are drawn at different dimensional scales in some cases for clarification of each of the components.

An example of a projector according to the present embodiment will be described.

Figure 1:
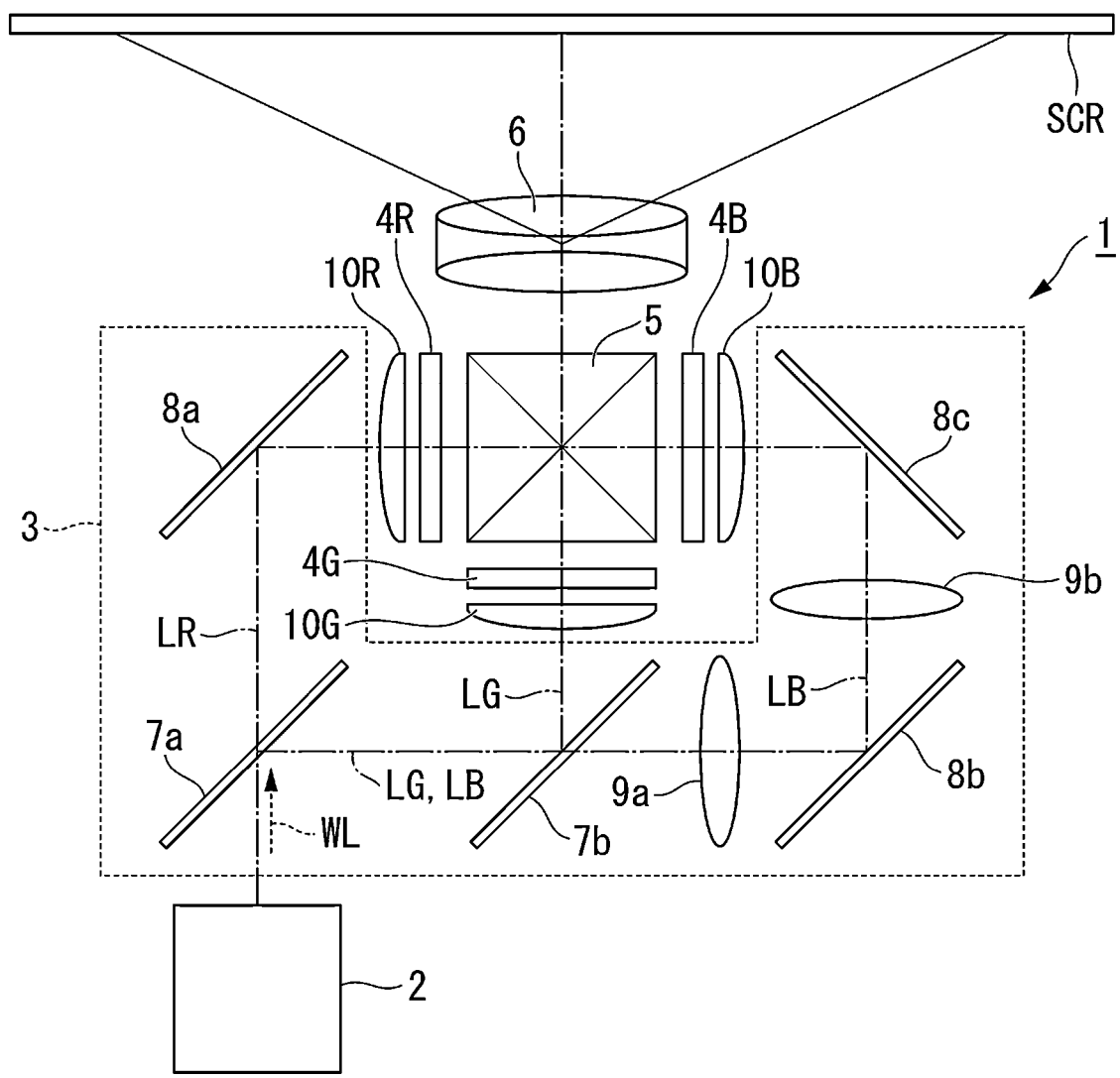
FIG. 1 is a schematic configuration diagram of a projector according to a first embodiment.

FIG. 1 is a schematic configuration diagram of the projector according to the present embodiment.

A projector 1 according to the present embodiment is a projection-type image display apparatus that displays color video images on a screen SCR, as shown in FIG. 1. The projector 1 includes an illuminator 2, a color separation system 3, light modulators 4R, 4G, and 4B, a light combining system 5, and a projection optical apparatus 6. The configuration of the illuminator 2 will be described later.

The color separation system 3 includes a first dichroic mirror 7a, a second dichroic mirror 7b, a reflection mirror 8a, a reflection mirror 8b, a reflection mirror 8c, a relay lens 9a, and a relay lens 9b. The color separation system 3 separates illumination light WL outputted from the illuminator 2 into red light LR, green light LG, and blue light LB, guides the red light LR to the light modulator 4R, guides the green light LG to the light modulator 4G, and guides the blue light LB to the light modulator 4B.

A field lens 10R is disposed between the color separation system 3 and the light modulator 4R, substantially parallelizes incident light, and causes the resultant light to exit toward the light modulator 4R. A field lens 10G is disposed between the color separation system 3 and the light modulator 4G, substantially parallelizes incident light, and causes the resultant light to exit toward the light modulator 4G. A field lens 10B is disposed between the color separation system 3 and the light modulator 4B, substantially parallelizes incident light, and causes the resultant light to exit toward the light modulator 4B.

The first dichroic mirror 7a transmits a red light component and reflects a green light component and a blue light component. The second dichroic mirror 7b reflects the green light component and transmits the blue light component. The reflection mirror 8a reflects the red light component. The reflection mirrors 8b and 8c reflect the blue light component.

The red light LR having passed through the first dichroic mirror 7a is reflected off the reflection mirror 8a, passes through the field lens 10R, and is incident on an image formation area of the light modulator 4R for red light. The green light LG reflected off the first dichroic mirror 7a is further reflected off the second dichroic mirror 7b, passes through the field lens 10G, and is incident on an image formation area of the light modulator 4G for green light. The blue light LB having passed through the second dichroic mirror 7b travels via the relay lens 9a, the light-incident-side reflection mirror 8b, the relay lens 9b, the light-exiting-side reflection mirror 8c, and the field lens 10B and is incident on an image formation area of the light modulator 4B for blue light.

The light modulators 4R, 4G, and 4B each modulate the color light incident thereon in accordance with image information to form image light. The light modulators 4R, 4G, and 4B are each formed of a liquid crystal light valve. Although not shown, a light-incident-side polarizer is disposed on the light incident side of each of the light modulators 4R, 4G, and 4B. A light-exiting-side polarizer is disposed on the light exiting side of each of the light modulators 4R, 4G, and 4B.

The light combining system 5 combines the image light outputted from the light modulator 4R, the image light outputted from the light modulator 4G, and the image light outputted from the light modulator 4B with one another to form full-color image light. The light combining system 5 is formed of a cross dichroic prism formed of four right angled prisms bonded to each other and having a substantially square shape in a plan view. Dielectric multilayer films are formed along the substantially X-letter-shaped interfaces between the right angled prisms bonded to each other.

The image light having exited out of the light combining system. 5 is enlarged and projected by the projection optical apparatus 6 to form an image on the screen S. That is, the projection optical apparatus 6 projects the light modulated by the light modulators 4R, 4G, and 4B. The projection optical apparatus 6 is formed of a plurality of projection lenses.

An example of the illuminator 2 according to the present embodiment will be described.

Figure 2:
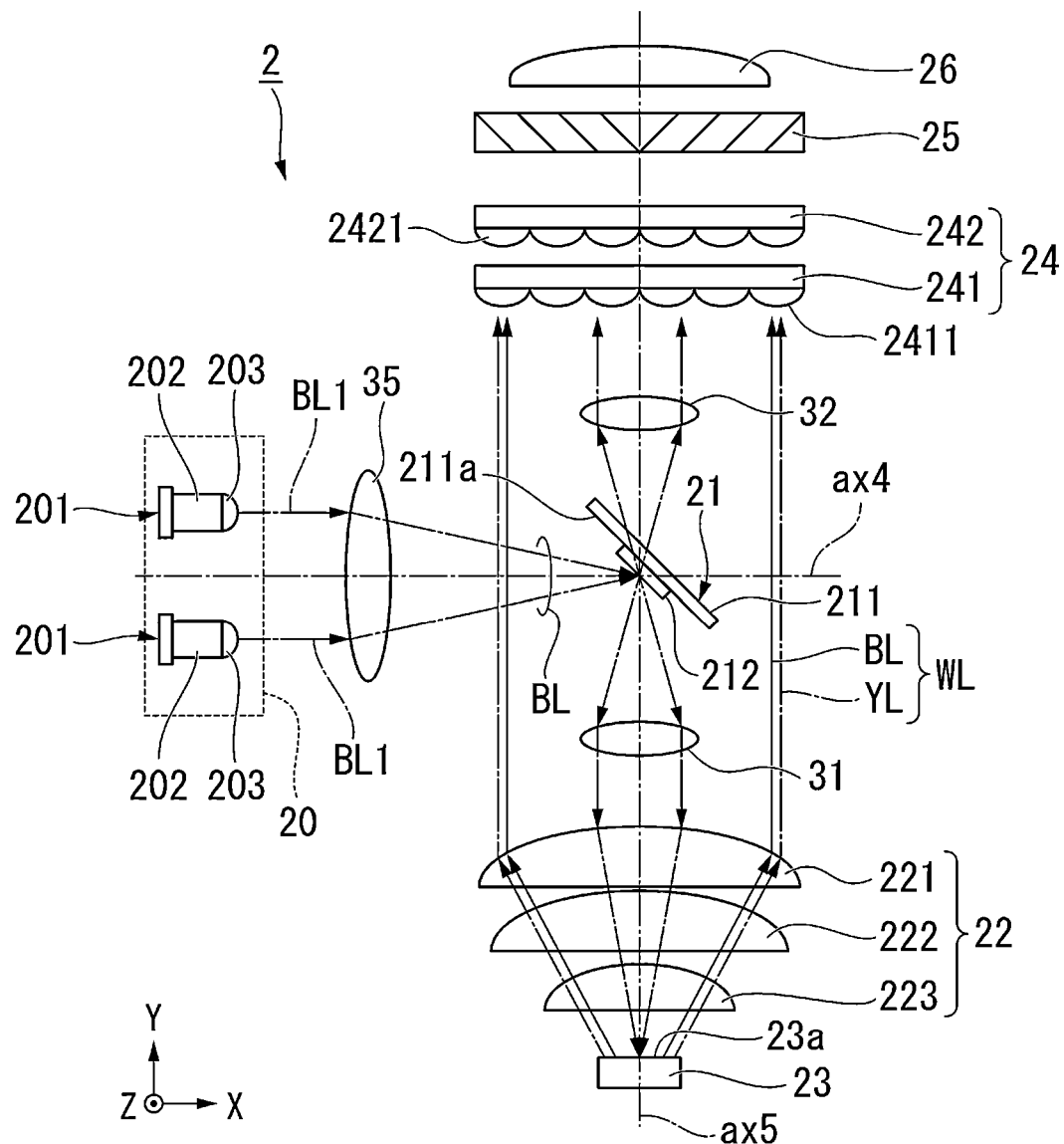
FIG. 2 is a plan view showing a schematic configuration of an illuminator according to the first embodiment.

In FIG. 2 and in the following description, an XYZ orthogonal coordinate system is used, and the axes thereof are defined as follows: An axis X is an axis parallel to the chief ray of blue light BL outputted from a light emitting apparatus 20; an axis Y is an axis parallel to the chief ray of fluorescence YL emitted from a wavelength converter 23; and an axis Z is an axis perpendicular to the axes X and Y.

Further, an axis along the chief ray of the blue light BL is called an optical axis ax4 of the light emitting apparatus 20. That is, the optical axis ax4 of the light emitting apparatus 20 is parallel to the axis X. The axis along the chief ray of the fluorescence YL is called an optical axis ax5 of the wavelength converter 23. That is, the optical axis ax5 of the wavelength converter 23 is parallel to the axis Y.

FIG. 2 is a plan view of the illuminator 2 viewed in the axis-Z direction.

The illuminator 2 according to the present embodiment includes the light emitting apparatus 20, a focusing lens 35 (first optical system), an optical element 21, a first adjustment lens 31 (second optical system), and a focusing pickup system 22 (third optical system), the wavelength converter 23, a second adjustment lens 32 (fourth optical system), an optical integration system 24, a polarization converter 25, and a superimposing lens 26, as shown in FIG. 2.

The light emitting apparatus 20 includes a plurality of light emitters 201. In the present embodiment, the light emitting apparatus 20 includes four light emitters 201. The four light emitters 201 are arranged separately from each other in two rows and two columns along the axes Y and Z. The number and arrangement of the light emitters 201, which form the light emitting apparatus 20, are not limited to a specific number and arrangement.

The light emitters 201 each include a blue semiconductor laser and output a blue luminous flux BL1, which belongs to a first wavelength band. The blue semiconductor laser outputs the blue luminous flux BL1, which belongs, for example, to a first wavelength band having a peak wavelength that falls within a range from 380 to 495 nm. The light emitting apparatus 20 therefore outputs four blue luminous fluxes BL1 as a whole. In the present specification, the four blue luminous fluxes BL1 are collectively referred to as blue light BL, and the center axis of the entire four blue luminous fluxes BL1 is referred to as the chief ray of blue light BL. As will be described later, part of the blue light BL functions as excitation light that excites a phosphor contained in the wavelength converter 23. The blue light BL in the present embodiment corresponds to the first light in the appended claims.

In the present embodiment, the light emitters 201 are each what is called a CAN-package-type laser device that is a package that accommodates one semiconductor laser chip. The light exiting surface of a package 202 is provided with a collimator lens 203, which is formed of a convex lens, and the blue luminous flux BL1 parallelized by the collimator lens 203 is outputted. The light emitters 201 may instead be a light emitter in the form of a single package that accommodates a plurality of semiconductor laser chips.

The focusing lens 35 is provided between the light emitting apparatus 20 and the optical element 21. The focusing lens 35 is formed of a convex lens having positive power, and the blue light BL outputted from the light emitting apparatus 20 enters the focusing lens 35. The focusing lens 35 in the present embodiment has a focal point on the optical element 21, and the blue light BL outputted from the light emitting apparatus 20 is focused into a single point at the center of the optical element 21. The center of the optical element 21 coincides with the intersection of the optical axis ax4 of the light emitting apparatus 20 and the optical axis ax5 of the wavelength converter 23. The focusing lens 35 therefore focuses the blue light BL outputted from the light emitting apparatus 20 into a single point at the intersection of the optical axis ax4 of the light emitting apparatus 20 and the optical axis ax5 of the wavelength converter 23. In other words, the focal length of the focusing lens 35 coincides with the distance between the principal point of the focusing lens 35 and the center of the optical element 21. The focusing lens 35 in the present embodiment corresponds to the first optical system in the appended claims. The first optical system is formed of one lens in the present embodiment, but the number of lenses that form the first optical system is not limited to a specific number, and the first optical system may be formed of a plurality of lenses. When the first optical system is formed of a plurality of lenses, the focal length of the entire first optical system coincides with the distance between the principal point of the entire first optical system and the center of the optical element. The lens surface of the focusing lens 35 may be provided with an antireflection film associated with the blue light BL.

The optical element 21 is so disposed as to incline by 45° with respect to the optical axes ax4 and ax5. That is, the optical element 21 is provided in the position where the optical axis ax4 of the light emitting apparatus 20 and the optical axis ax5 of the wavelength converter 23 intersect each other. The optical element 21 is so characterized as to reflect light that belongs to a blue wavelength band and transmit light that belongs to a yellow wavelength band. The optical element 21 therefore reflects the blue light BL outputted from the light emitting apparatus 20 and transmits the fluorescence YL emitted from the wavelength converter 23. The optical element 21 in the present embodiment corresponds to the optical element in the appended claims.

The optical element 21 includes a light transmissive substrate 211 and a dichroic mirror 212. The dichroic mirror 212 is provided at a first surface 211a of the light transmissive substrate 211, reflects the blue light BL outputted from the light emitting apparatus 20, and transmits the fluorescence YL emitted from the wavelength converter 23. The dichroic mirror 212 is provided at part of the light transmissive substrate 211 in the present embodiment, and the light transmissive substrate 211 may instead be so reduced that the size thereof is equal to the size of the dichroic mirror 212, and the dichroic mirror 212 may be provided across the entire area of the light transmissive substrate 211.

The first adjustment lens 31 is provided between the optical element 21 and the focusing pickup system 22. The first adjustment lens 31 is formed of a convex lens having positive power, and the blue light BL having exited out of the optical element 21 and the fluorescence YL and the blue light BL emitted from the wavelength converter 23 enter the first adjustment lens 31. The first adjustment lens 31 is large enough for the blue light BL to enter but is smaller than each lens that forms the focusing pickup system 22. The lens surface of the first adjustment lens 31 may be provided with an antireflection film associated with light that belongs to the entire visible region.

The first adjustment lens 31 in the present embodiment causes the blue light BL having exited out of the optical element 21 to exit toward the focusing pickup system 22 and parallelizes the blue light BL. That is, the first adjustment lens 31 converts the blue light BL having exited out of the optical element 21 and having a predetermined angle of divergence into parallelized blue light BL and causes the parallelized blue light BL to exit toward the focusing pickup system 22. The focal length of the first adjustment lens 31 therefore coincides with the distance between the first adjustment lens 31 and the optical element 21. The distance between the first adjustment lens 31 and the optical element 21 is defined as the distance between the principal point of the first adjustment lens 31 and the center of the optical element 21. The first adjustment lens 31 has the function of adjusting the illuminance distribution of the blue light BL that enters the wavelength converter 23 via the focusing pickup system 22. The first adjustment lens 31 in the present embodiment corresponds to the second optical system in the appended claims. The second optical system is formed of one lens in the present embodiment, but the number of lenses that form the second optical system is not limited to a specific number, and the second optical system may be formed of a plurality of lenses. When the second optical system is formed of a plurality of lenses, the focal length of the entire second optical system coincides with the distance between the principal point of the entire second optical system and the center of the optical element 21.

The focusing pickup system 22 is provided between the first adjustment lens 31 and the wavelength converter 23. The focusing pickup system 22 has positive power and is formed of three convex lenses, a first lens 221, a second lens 222, and a third lens 223. The focusing pickup system 22 has a focal point on the wavelength converter 23. The focusing pickup system 22 focuses the parallelized blue light BL having exited out of the first adjustment lens 31 and causes the parallelized blue light BL to enter the wavelength converter 23. The focusing pickup system 22 in the present embodiment corresponds to the third optical system in the appended claims. The third optical system is formed of three lenses in the present embodiment, but the number of lenses that form the third optical system is not limited to a specific number.

The wavelength converter 23 has a first surface 23a, on which the blue light BL is incident, converts part of the blue light BL into the fluorescence YL, and causes the fluorescence YL and the other part of the blue light BL to exit via the first surface 23a.

Figure 3:
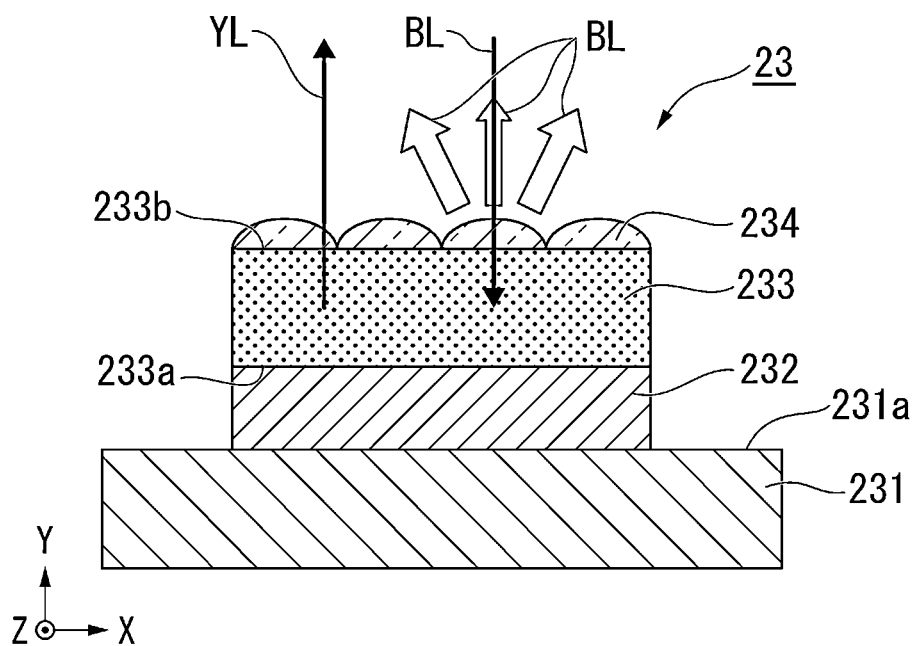
FIG. 3 is a cross-sectional view of a wavelength converter.

FIG. 3 is a cross-sectional view of the wavelength converter 23.

The wavelength converter 23 includes a substrate 231, a reflection layer 232, a wavelength conversion layer 233, and a structural element 234, as shown in FIG. 3. The wavelength converter 23 converts the blue light BL having exited out of the focusing pickup system 22 into the fluorescence YL, which belongs to a second wavelength band different from the first wavelength band. The wavelength conversion layer 233 contains a ceramic phosphor that converts the blue light BL into the yellow fluorescence YL. The second wavelength band ranges, for example, from 490 to 750 nm, and the fluorescence YL is yellow light containing the green light component and the red light component. The phosphor may contain a monocrystalline phosphor. Further, the wavelength converter 23 has a substantially square planar shape when viewed in the direction in which the blue light BL is incident (axis-Y direction). The fluorescence YL in the present embodiment corresponds to the second light in the appended claims.

The substrate 231 functions as a support substrate that supports the reflection layer 232, the wavelength conversion layer 233, and the structural element 234 and further functions as a heat dissipation substrate that dissipates heat generated in the wavelength conversion layer 233. The substrate 231 is made of a material having high thermal conductivity, such as metal and ceramic.

The reflection layer 232 is provided at a first surface 231a of the substrate 231. That is, the reflection layer 232 is located between the first surface 231a of the substrate 231 and a first surface 233a of the wavelength conversion layer 233 and reflects the fluorescence YL incident from the wavelength conversion layer 233 toward the wavelength conversion layer 233. The reflection layer 232 is formed, for example, of a laminated film including a dielectric multilayer film, a metal mirror, an enhanced reflection film, and other films.

The wavelength conversion layer 233 contains, for example, an yttrium-aluminum-garnet-based (YAG-based) phosphor. Consider YAG:Ce, which contains cerium (Ce) as an activator, by way of example, and the YAG:Ce phosphor can be made, for example, of a material produced by mixing raw powder materials containing $Y_2O_3$, $Al_2O_3$, $CeO_3$, and other constituent elements with one another and causes the mixture to undergo a solid-phase reaction, Y—Al—O amorphous particles produced by using a coprecipitation method, a sol-gel method, or any other wet method, or YAG particles produced by using a spray-drying method, a flame-based thermal decomposition method, a thermal plasma method, or any other gas-phase method.

The structural element 234 is provided at a second surface 233b of the wavelength conversion layer 233. The structural element 234 scatters part of the blue light BL having entered the wavelength converter 23 and reflects the scattered blue light BL in the opposite direction from the direction in which the blue light BL is incident. The structural element 234 is made of a light transmissive material and has a plurality of scattering structures. The scattering structures in the present embodiment each have a lens shape formed of a convex portion.

The structural element 234 is formed separately from the wavelength conversion layer 233. The structural element 234 in the present embodiment is suitably formed, for example, by forming a dielectric element in a vapor deposition method, a sputtering method, a CVD method, or a coating method and then processing the dielectric element in photolithography. The structural element 234 is desirably made of a chemically stable material that absorbs light only by a small amount. That is, the structural element 234 can be made of a material having a refractive index that falls within a range from 1.3 to 2.5, for example, $SiO_2$, SiON, or $TiO_2$. For example, the structural element 234 made of $SiO_2$ can be processed with high precision by using wet etching or dry etching.

According to the configuration described above, out of the blue light BL having entered the wavelength converter 23, part of the blue light BL passes through the structural element 234 and is then converted in terms of wavelength by the wavelength conversion layer 233 into the fluorescence YL. That is, part of the blue light BL functions as the excitation light that excites the phosphor. On the other hand, the other part of the blue light BL is backscattered by the structural element 234 before converted in terms of wavelength into the fluorescence YL and is caused to exit out of the wavelength converter 23 without undergoing the wavelength conversion. In this process, the blue light BL exits in the form of diffused light having an angular distribution that is substantially the same as the angular distribution of the fluorescence YL.

In place of the structural element 234 described above, the wavelength conversion layer 233 may include a scattering element that scatters the blue light BL and the fluorescence YL. The scattering element is, for example, a plurality of pores formed in the phosphor. In this case, out of the blue light BL having entered the wavelength converter 23, part of the blue light BL is converted in terms of wavelength into the fluorescence YL, whereas the other part of the blue light BL is backscattered by the scattering element contained in the phosphor before converted in terms of wavelength into the fluorescence YL and caused to exit out of the wavelength converter 23 without undergoing the wavelength conversion.

As shown in FIG. 2, the second adjustment lens 32 is provided in the optical path of the fluorescence YL having exited out of the optical element 21. Specifically, the second adjustment lens 32 is provided between the optical element 21 and the optical integration system 24. The second adjustment lens 32 is formed of a convex lens having positive power, and the fluorescence YL having exited out of the first adjustment lens 31 enters the second adjustment lens 32 via the optical element 21.

The second adjustment lens 32 causes the fluorescence YL having exited out of the optical element 21 to exit and parallelizes the fluorescence YL. That is, the second adjustment lens 32 converts the fluorescence YL that enters the second adjustment lens 32 at a predetermined angle of divergence into parallelized fluorescence YL and causes the parallelized fluorescence YL to exit. The curvature of the second adjustment lens 32 is equal to the curvature of the first adjustment lens 31. That is, the focal length of the second adjustment lens 32 coincides with the focal length of the first adjustment lens 31 and further coincides with the distance between the second adjustment lens 32 and the optical element 21. The distance between the second adjustment lens 32 and the optical element 21 is defined as the distance between the principal point of the second adjustment lens 32 and the center of the optical element 21. The second adjustment lens 32 in the present embodiment corresponds to the fourth optical system in the appended claims. In the present embodiment, the fourth optical system is formed of one lens, but the number of lenses that form the fourth optical system is not limited to a specific number, and the fourth optical system may be formed of a plurality of lenses. When the fourth optical system is formed of a plurality of lenses, the focal length of the entire fourth optical system coincides with the distance between the principal point of the entire fourth optical system and the center of the optical element 21. The lens surface of the second adjustment lens 32 may be provided with an antireflection film associated with light that belongs to the entire visible region.

Figure 4:
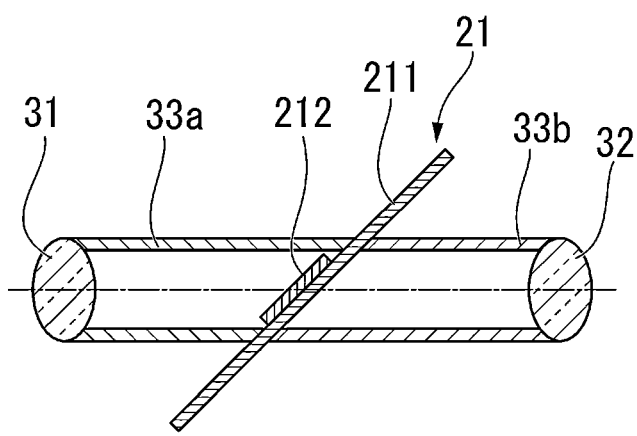
FIG. 4 is a cross-sectional view showing a holding structure that holds a first adjustment lens and a second adjustment lens.

FIG. 4 is a cross-sectional view showing a holding structure that holds the first adjustment lens 31 and the second adjustment lens 32.

The first adjustment lens 31 is held by a holding member 33a relative to the optical element 21, as shown in FIG. 4. Similarly, the second adjustment lens 32 is held by a holding member 33b relative to the optical element 21. The holding members 33a and 33b are each made of a light transmissive material, for example, glass and formed of a hollow cylindrical member having a void interior. The holding members 33a and 33b each have a surface produced by obliquely cutting at an angle of 45° at the longitudinal center of a hollow cylindrical member, and the cut surfaces are fixed to the optical element 21, for example, with an adhesive. The first adjustment lens 31 is fixed to the opposite end surface of the holding member 33a from the side facing the optical element 21, and the second adjustment lens 32 is fixed to the opposite end surface of the holding member 33b from the side facing the optical element 21. The first adjustment lens 31 and the second adjustment lens 32 are fixed to the holding member 33a and the holding member 33b, respectively, for example, with an adhesive.

In the present embodiment, since the focusing lens 35 having positive power is provided between the light emitting apparatus 20 and the optical element 21, the blue light BL in the form of focused light is incident on the dichroic mirror 212. The dichroic mirror 212 can therefore be reduced in size as compared with a case where no focusing lens 35 is provided. Since the dichroic mirror 212 is so characterized as to transmit a yellow light component, a central luminous flux of the fluorescence YL emitted from the wavelength converter 23 passes through the focusing pickup system 22 and then passes through the dichroic mirror 212. A peripheral luminous flux of the fluorescence YL emitted from the wavelength converter 23 is not incident on the dichroic mirror 212 but passes through the light transmissive substrate 211 or the space outside the optical element 21.

Out of the blue light BL having exited out of the wavelength converter 23A, a central luminous flux is incident on the dichroic mirror 212, but a peripheral luminous flux is not incident on the dichroic mirror 212 but passes through the light transmissive substrate 211 or the space outside optical element. The central luminous flux that is formed of the blue light BL and incident on the dichroic mirror 212 is reflected off the dichroic mirror 212 and lost, but the luminous flux that is formed of the blue light BL and is not incident on the dichroic mirror 212 is used along with the fluorescence YL as the illumination light WL. In this case, reducing the size of the dichroic mirror 212 can reduce the amount of blue light BL reflected off the dichroic mirror 212 and lost.

The blue light BL and the fluorescence YL thus enter the optical integration system 24. The blue luminous flux BL and the yellow fluorescence YL are combined with each other to produce the white illumination light WL.

The optical integration system 24 includes a first multi-lens array 241 and a second multi-lens array 242. The first multi-lens array 241 includes a plurality of first lenses 2411, which divide the illumination light WL into a plurality of sub-luminous fluxes.

The lens surface of the first multi-lens array 241, that is, the surfaces of the first lenses 2411 are conjugate with the image formation area of each of the light modulators 4R, 4G, and 4B. Therefore, when viewed in the direction of the optical axis ax5, the first lenses 2411 each have a rectangular shape substantially similar to the shape of the image formation area of each of the light modulators 4R, 4G, and 4B. The sub-luminous fluxes having exited out of the first multi-lens array 241 are thus each efficiently incident on the image formation area of each of the light modulators 4R, 4G, and 4B.

The second multi-lens array 242 includes a plurality of second lenses 2421 corresponding to the plurality of first lenses 2411 in the first multi-lens array 241. The second multi-lens array 242 along with the superimposing lens 26 brings images of the first lenses 2411 of the first multi-lens array 241 into focus in the vicinity of the image formation area of each of the light modulators 4R, 4G, and 4B.

The illumination light WL having passed through the optical integration system 24 enters the polarization converter 25. The polarization converter 25 has a configuration in which polarization separation films and retardation films that are not shown are arranged in an array. The polarization converter 25 aligns the polarization directions of the illumination light WL with a predetermined direction. Specifically, the polarization converter 25 aligns the polarization directions of the illumination light WL with the direction of the transmission axis of the light-incident-side polarizers for the light modulators 4R, 4G, and 4B.

The polarization directions of the red light LR, the green light LG, and the blue light LB separated from the illumination light WL having passed through the polarization converter 25 coincide with the transmission axis direction of the light-incident-side polarizers for the light modulators 4R, 4G, and 4B. The red light LR, the green light LG, and the blue light LB are therefore incident on the image formation areas of the light modulators 4R, 4G, and 4B, respectively, without being blocked by the light-incident-side polarizers.

The illumination light WL having passed through the polarization converter 25 enters the superimposing lens 26. The superimposing lens 26, in cooperation with the optical integration system 24, homogenizes the illuminance distribution in the image formation area of each of the light modulators 4R, 4G, and 4B, which are illumination receiving areas.

Effects of First Embodiment

The illuminator 2 according to the present embodiment includes the light emitting apparatus 20, which outputs the blue light BL, the wavelength converter 23, which converts part of the blue light BL into the fluorescence YL and outputs the fluorescence YL and the other part of the blue light BL, the focusing lens 35, which has positive power and which the blue light BL enters, the optical element 21, which the blue light BL having exited out of the focusing lens 35 enters, reflects the blue light BL, and transmits the fluorescence YL, the first adjustment lens 31, which has positive power and which the blue light BL having exited out of the optical element 21 and the fluorescence YL emitted from the wavelength converter 23 enter, the focusing pickup system 22, which has positive power and causes the blue light BL having exited out of the first adjustment lens 31 to enter the wavelength converter 23, and the second adjustment lens 32, which has positive power and which the fluorescence YL having exited out of the first adjustment lens 31 enters.

In the illuminator 2 according to the present embodiment, the focusing lens 35 is provided between the light emitting apparatus 20 and the optical element 21, has a focal point on the optical element 21, and focuses the blue light BL outputted from the light emitting apparatus 20. The first adjustment lens 31 is provided between the optical element 21 and the focusing pickup system 22, converts the blue light BL having exited out of the optical element 21 into parallelized blue light BL, and causes the parallelized blue light BL to exit toward the focusing pickup system 22. The second adjustment lens 32 is provided in the optical path of the fluorescence YL having exited out of the optical element 21 and converts the fluorescence YL having entered the second adjustment lens 32 into parallelized fluorescence YL.

As described above, since the illuminator 2 according to the present embodiment has the focusing lens 35, the focusing lens 35 can focus the blue light BL to be incident on the dichroic mirror 212, whereby the dichroic mirror 212 can be reduced in size as compared in the related art. Particularly in the present embodiment, the blue light BL is focused by the focusing lens 35 into a single point on the dichroic mirror 212, whereby the dichroic mirror 212 can be sufficiently reduced in size. Therefore, out of the blue light BL having exited out of the wavelength converter 23, the amount of light reflected off the dichroic mirror 212 and returning toward the light emitting apparatus 20 can be reduced, whereby the efficiency of utilization of the blue light BL can be increased.

Further, since the illuminator 2 according to the present embodiment includes the first adjustment lens 31, the illuminance distribution of blue light BL on the wavelength converter 23 can be adjusted. In the present embodiment, the blue light BL is focused into a single point on the dichroic mirror 212 and therefore exits out of the dichroic mirror 212 in the form of light that diverges at a predetermined angle of divergence. Therefore, if no first adjustment lens 31 is provided, the blue light BL that diverges at the predetermined angle of divergence enters the focusing pickup system 22. In contrast, in the present embodiment, the blue light BL that diverges at the predetermined angle of divergence is parallelized by the first adjustment lens 31 and then enters the focusing pickup system 22. The blue light BL is therefore focused by the focusing pickup system 22 into a single point on the wavelength converter 23.

The fluorescence YL emitted from the wavelength converter 23 has a light orientation distribution close to the Lambertian distribution and is parallelized by the focusing pickup system 22. Out of the fluorescence YL having exited out of the focusing pickup system 22, a central luminous flux close to the optical axis ax5 is focused by the first adjustment lens 31 into a single point on the dichroic mirror 212 and exits out of the dichroic mirror 212 in the form of light that diverges at a predetermined angle of divergence. On the other hand, out of the fluorescence YL having exited out of the focusing pickup system 22, a peripheral luminous flux far from the optical axis ax5 does not enter the first adjustment lens 31 or the dichroic mirror 212 but travels toward the optical integration system 24.

The central luminous flux close to the optical axis ax5 out of the fluorescence YL exits out of the dichroic mirror 212 in the form of light that diverges at the predetermined angle of divergence, as described above. Therefore, if no second adjustment lens 32 is provided, part of the luminous flux may not undesirably enter the optical integration system 24, resulting in a problem of a decrease in the efficiency of utilization of the fluorescence YL. In contrast, in the present embodiment, since the second adjustment lens 32 is provided in the optical path of the fluorescence YL having exited out of the dichroic mirror 212, the fluorescence YL that diverges at the predetermined angle of divergence is parallelized by the second adjustment lens 32 and then travels toward the optical integration system 24. The amount of luminous flux that is not allowed to enter the integration optical system 24 can be reduced, whereby the decrease in the efficiency of utilization of the fluorescence YL can be suppressed. Therefore, according to the present embodiment, an illuminator 2 that excels in the efficiency of utilization of the blue light BL and the fluorescence YL can be provided.

Further, in the illuminator 2 according to the present embodiment, the optical element 21 includes the light transmissive substrate 211 and the dichroic mirror 212, which is provided at the light transmissive substrate 211, reflects the blue light BL, and transmits the fluorescence YL.

According to the configuration described above, an optical element 21 having a simple configuration can be achieved.

Further, in the illuminator 2 according to the present embodiment, the wavelength converter 23 includes the wavelength conversion layer 233, which converts the blue light BL into the fluorescence YL, the reflection layer 232, which is provided at the first surface 233a of the wavelength conversion layer 233, and the structural element 234, which is provided at the second surface 233b of the wavelength conversion layer 233.

According to the configuration described above, part of the blue light BL before entering the wavelength conversion layer 233 can be backscattered by the structural element 234, whereby the part of the blue light BL can be effectively used as the illumination light.

The projector 1 according to the present embodiment, which includes the illuminator 2 according to the present embodiment, excels in the light utilization efficiency.

Second Embodiment

A second embodiment of the present disclosure will be described below with reference to FIG. 5.

The configuration of the projector according to the second embodiment is the same as that in the first embodiment but differs therefrom in terms of the configuration of the illuminator. The overall configurations of the projector and the illuminator will therefore be not described.

Figure 5:
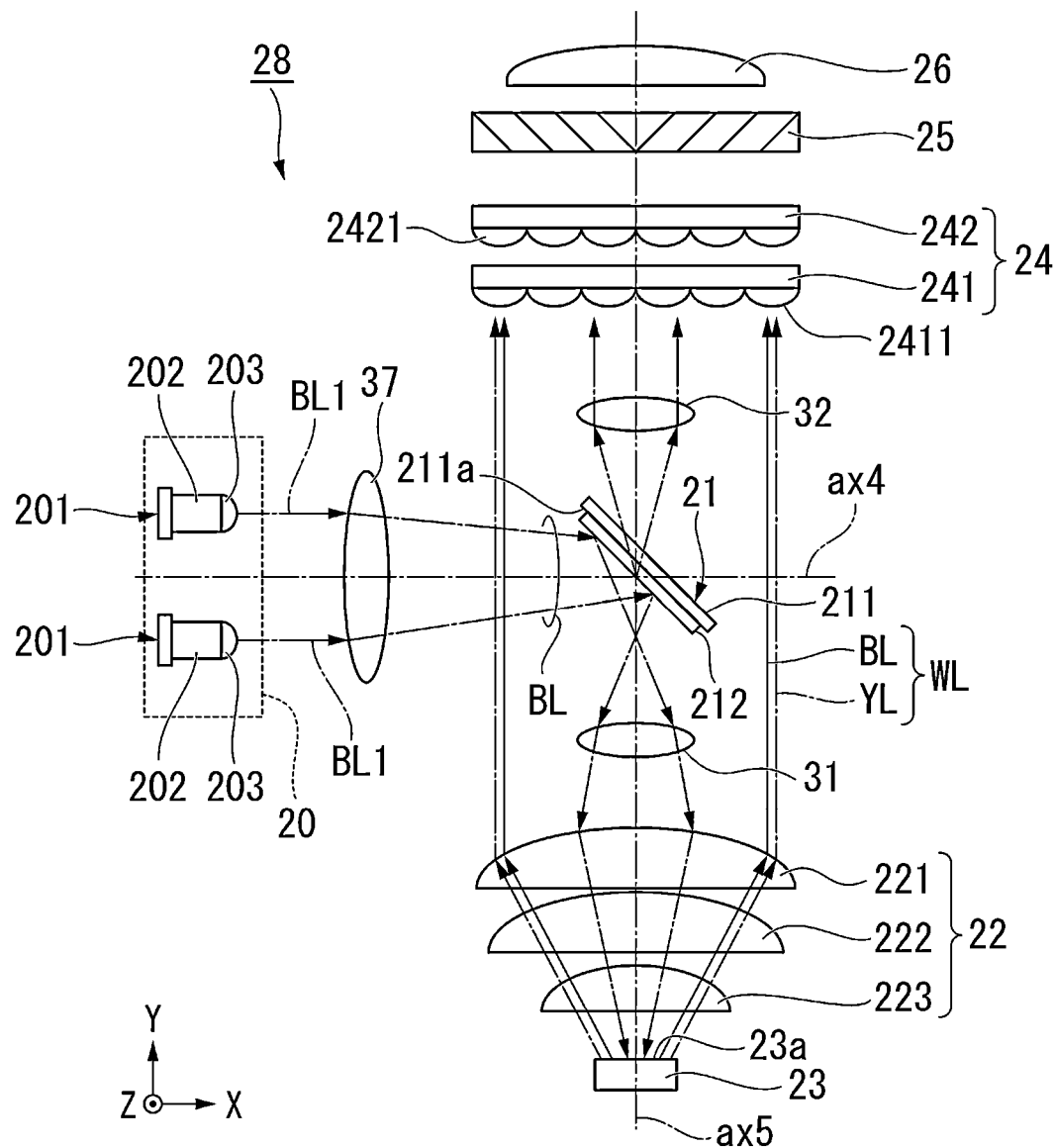
FIG. 5 is a plan view showing a schematic configuration of the illuminator according to a second embodiment.

FIG. 5 is a schematic configuration diagram of an illuminator 28 according to the second embodiment.

In FIG. 5, components common to those in the figures used in the first embodiment have the same reference characters and will not be described.

The illuminator 28 according to the present embodiment includes the light emitting apparatus 20, a focusing lens 37 (first optical system), the optical element 21, the first adjustment lens 31 (second optical system), the focusing pickup system 22 (third optical system), the wavelength converter 23, the second adjustment lens 32 (fourth optical system), the optical integration system 24, the polarization converter 25, and the superimposing lens 26, as shown in FIG. 5.

The focusing lens 35 in the first embodiment has a focal point on the optical element 21, and the blue light BL outputted from the light emitting apparatus 20 is focused into a single point at the center of the optical element 21. In contrast, the curvature of the focusing lens 37 in the present embodiment is greater than the curvature of the focusing lens 35 in the first embodiment, and the focusing lens 37 has a focal point located between the center of the optical element 21 and the principal point of the first adjustment lens 31. The blue light BL is therefore focused by the focusing lens 37 but is incident on the optical element 21 in the form of defocused light.

The first adjustment lens 31, the focusing pickup system 22, and the second adjustment lens 32 in the present embodiment are the same as the first adjustment lens 31, the focusing pickup system 22, and the second adjustment lens 32 in the first embodiment. On the other hand, the focusing lens 37 in the present embodiment differs from the focusing lens 35 in the first embodiment. Therefore, in the first embodiment, the blue light BL having exited out of the optical element 21 is parallelized by the first adjustment lens 31 and enters the focusing pickup system 22, whereas in the present embodiment, the blue light BL having exited out of the optical element 21 is not parallelized by the first adjustment lens 31 and enters the focusing pickup system 22. In the present embodiment, the first adjustment lens 31 causes the blue light BL having exited out of the optical element 21 to exit toward the focusing pickup system 22 and reduces the angle of divergence of the blue light BL after exiting out of the first adjustment lens 31 as compared with the angle of divergence of the blue light BL before entering the first adjustment lens 31.

In the present embodiment, since the blue light BL that is not parallelized enters the focusing pickup system 22 as described above, the blue light BL is not focused by the focusing pickup system 22 into a single point on the wavelength conversion element 23 but is defocused thereon, unlike in the first embodiment.

On the other hand, the fluorescence YL emitted from the wavelength converter 23 shows the same behavior as in the first embodiment. That is, out of the fluorescence YL emitted from the wavelength converter 23 and then parallelized by the focusing pickup system 22, the central luminous flux close to the optical axis ax5 is focused by the first adjustment lens 31 into a single point on the optical element 21 and then exits out of the optical element 21 in the form of light that diverges at the predetermined angle of divergence. The fluorescence YL that diverges at the predetermined angle of divergence is parallelized by the second adjustment lens 32 and then travels toward the optical integration system 24.

The other configurations of the illuminator 28 are the same as those of the illuminator 2 according to the first embodiment.

Effects of Second Embodiment

The present embodiment also provides the same effects as those provided by the first embodiment, for example, an illuminator 28 that excels in the efficiency of utilization of the blue light BL and the fluorescence YL can be achieved.

Further, in the illuminator 28 according to the present embodiment, the blue light BL in the form of defocused light enters the wavelength converter 23.

According to the configuration described above, the optical density of the blue light BL at the wavelength converter 23 can be reduced as compared with the optical density in the illuminator 2 according to the first embodiment, in which the blue light BL is focused into a single point on the wavelength converter 23. An increase in the temperature of the wavelength converter 23 can therefore be suppressed, whereby the wavelength conversion efficiency and the reliability of the wavelength converter 23 can be improved.

Third Embodiment

A third embodiment of the present disclosure will be described below with reference to FIGS. 6 to 10.

The configuration of the projector according to the third embodiment is the same as that in the first embodiment but differs therefrom in terms of the configuration of the illuminator. The overall configurations of the projector and the illuminator will therefore not be described.

Figure 6:
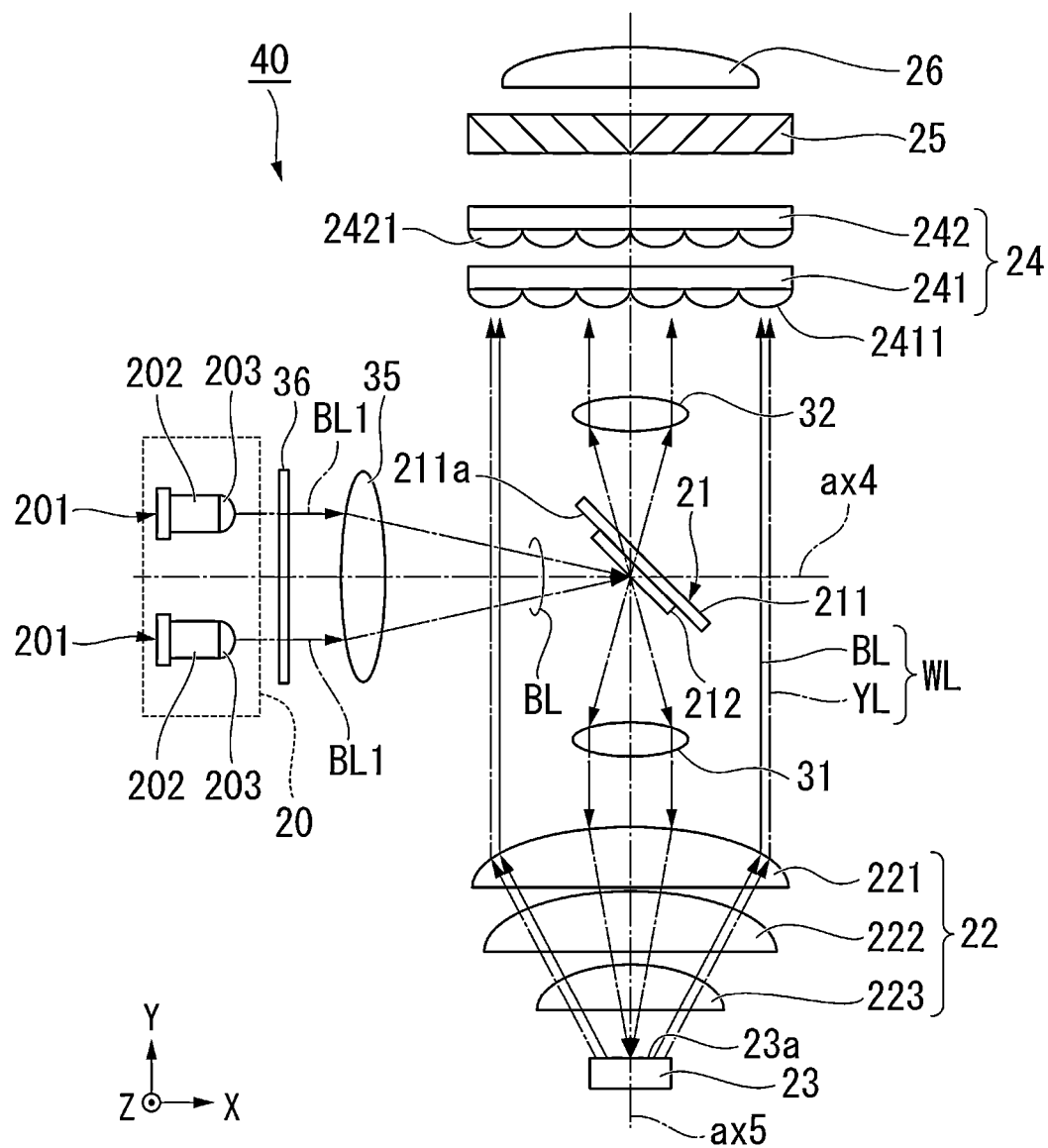
FIG. 6 is a plan view showing a schematic configuration of the illuminator according to a third embodiment.

FIG. 6 is a schematic configuration diagram of the illuminator according to the third embodiment.

In FIG. 6, components common to those in the figures used in the first embodiment have the same reference characters and will not be described.

An illuminator 40 according to the present embodiment includes the light emitting apparatus 20, a diffuser 36, the focusing lens 35 (first optical system), the optical element 21, the first adjustment lens 31 (second optical system), the focusing pickup system 22 (third optical system), the wavelength converter 23, the second adjustment lens 32 (fourth optical system), the optical integration system 24, the polarization converter 25, the superimposing lens 26, as shown in FIG. 6.

The diffuser 36 is provided between the light emitting apparatus 20 and the focusing lens 35, diffuses the blue light BL outputted from the light emitting apparatus 20, and causes the diffused blue light BL to exit toward the focusing lens 35. The diffuser 36 lowers the peak value of the illuminance of the blue light BL on the wavelength converter 23. The diffuser 36 is, for example, a polished glass plate made of optical glass or a light transmissive substrate provided with a plurality of structural elements each having a lens shape. The diffuser 36 only needs to be provided between the light emitting apparatus 20 and the optical element 21 and may be provided, for example, between the focusing lens 35 and the optical element 21.

The focusing lens 35 has a focal point on the optical element 21, as in the first embodiment, and focuses the blue light BL outputted from the light emitting apparatus 20 into a single point on the optical element 21.

The other configurations of the illuminator 40 are the same as those of the illuminator 2 according to the first embodiment.

Effects of Third Embodiment

The present embodiment also provides the same effects as those provided by the first embodiment, for example, an illuminator 40 that excels in the efficiency of utilization of the blue light BL and the fluorescence YL can be achieved.

The illuminator 40 according to the present embodiment further includes the diffuser 36, which is provided between the light emitting apparatus 20 and the optical element 21 and diffuses the blue light BL.

According to the configuration described above, the peak value of the illuminance of the blue light BL at the wavelength converter 23 can be lowered as compared with the peak value in the illuminator 2 according to the first embodiment, in which the blue light BL is focused into a single point on the wavelength converter 23. An increase in local temperature of the wavelength converter 23 can thus be suppressed, whereby the wavelength conversion efficiency and the reliability of the wavelength converter 23 can be improved.

The present inventor conducted a simulation for demonstrating the effect of the diffuser 36 in the illuminator 40 according to the present embodiment. Specifically, based on the simulation, the present inventor determined the illuminance distribution of the blue light BL with which the wavelength converter 23 was irradiated.

Example 1

As a condition under which the illuminator according to Example 1 was simulated, the angle of diffusion achieved by the diffuser was set at 6°. The angle of diffusion was defined by the position in the form of a full angle where the center luminance of the light diffused by the diffuser is halved.

Figure 7:
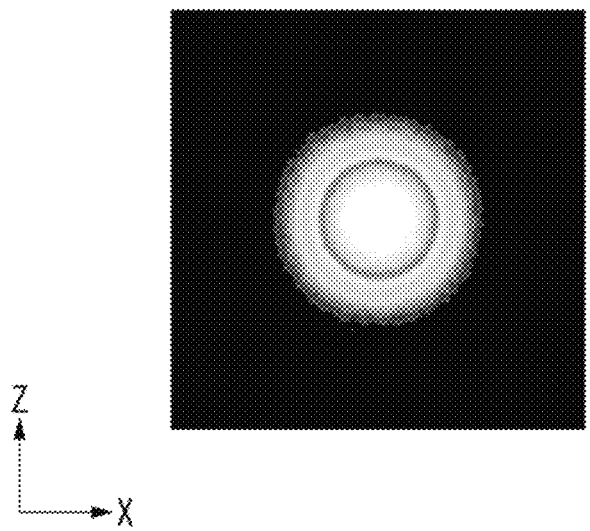
FIG. 7 shows the illuminance distribution on a wavelength converter in the illuminator according to the third embodiment.

FIG. 7 shows a simulation result showing the illuminance distribution of the blue light on the wavelength converter viewed in the direction in which the blue light is incident.

In every simulation below, the position where the blue light is incident was set so that the chief ray of the blue light coincides with the center of the wavelength converter. Further, in every figure below showing the results of the simulation of the illuminance distribution, the white area is an area where the illuminance is relatively high, and the black area is an area where the illuminance is relatively low.

The illuminator according to Example 1, in which a diffuser that achieves an angle of diffusion of 6° is used to diffuse the blue light, provides an illuminance distribution that spread coaxially around the optical axis of the blue light, as shown in FIG. 7.

Figure 8:
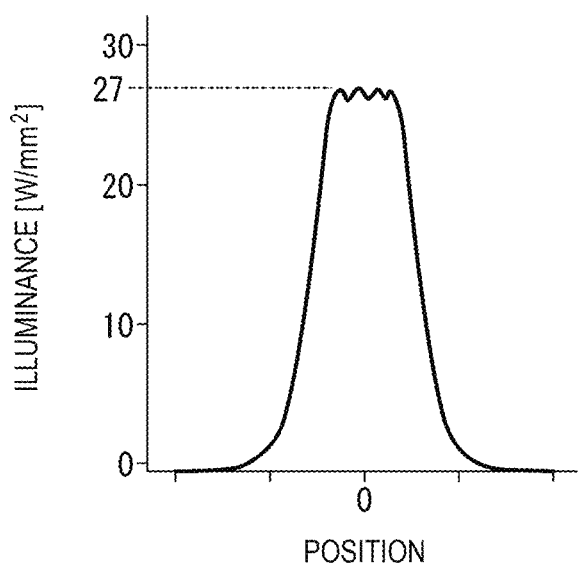
FIG. 8 shows the illuminance distribution in FIG. 7 in the form of a graph.

FIG. 8 shows the illuminance distribution in FIG. 7 in the form of a graph.

In every figure below showing the illuminance distribution in the form of a graph, the horizontal axis represents a relative position on the wavelength converter, and the position "0" represents the position of the chief ray of the blue light. The vertical axis shows the illuminance [$W/mm^2$]. The conversion into a graph shows that the resultant illuminance distribution along the axis X (horizontal direction in FIG. 7) and the resultant illuminance distribution along the axis Z (vertical direction in FIG. 7) are substantially the same, and the illuminance distributions along the axes X and Z are shown in the form of one graph in every figure below in the form of a graph.

The illuminator according to Example 1 provides an illuminance distribution in which the maximum illuminance of the blue light is substantially constant at about 27 $W/mm^2$, as shown in FIG. 8.

Example 2

The angle of diffusion achieved by the diffuser was then set at 4° as the condition under which the illuminator according to Example 2 was simulated.

Figure 9:
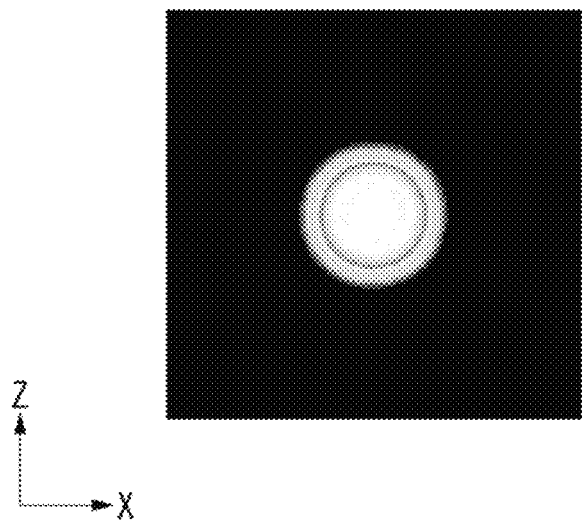
FIG. 9 shows the illuminance distribution on the wavelength converter in the illuminator according to a variation of the third embodiment.

FIG. 9 shows a simulation result showing the illuminance distribution of the blue light on the wavelength converter viewed in the direction in which the blue light is incident.

The illuminator according to Example 2, in which a diffuser that achieves an angle of diffusion of 4° is used to diffuse the blue light, provides an illuminance distribution that spread coaxially around the optical axis of the blue light, as shown in FIG. 9. The degree of the spread of the illuminance distribution is smaller than the spread of the illuminance distribution in Example 1.

Figure 10:
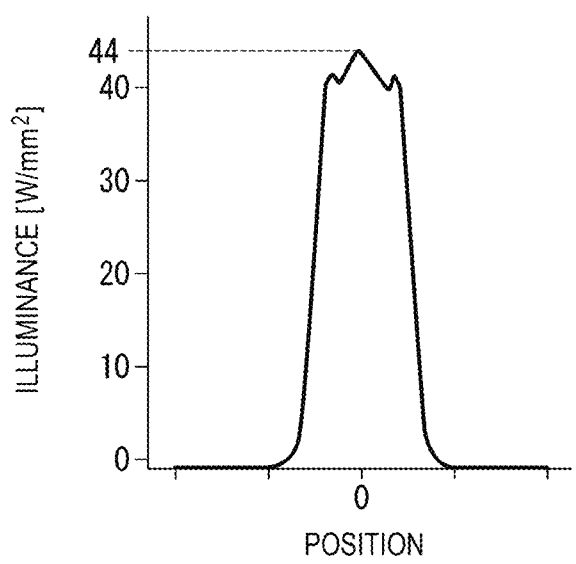
FIG. 10 shows the illuminance distribution in FIG. 9 in the form of a graph.

FIG. 10 shows the illuminance distribution in FIG. 9 in the form of a graph.

The illuminator according to Example 2 allows the maximum illuminance of the blue light to be about 44 $W/mm^2$, as shown in FIG. 10. The maximum illuminance is greater than the maximum illuminance in Example 1.

As can be seen from the simulations in Examples 1 and 2, the illuminator 40 according to the third embodiment has demonstrated that the peak value of the illuminance of the blue light BL at the wavelength converter 23 can be lowered as compared with the peak value provided by the illuminator 2 according to the first embodiment including no diffuser 36.

Fourth Embodiment

A fourth embodiment of the present disclosure will be described below with reference to FIGS. 11 to 17.

The configuration of the projector according to the fourth embodiment is the same as that in the first embodiment but differs therefrom in terms of the configuration of the illuminator. The overall configurations of the projector and the illuminator will therefore not be described.

Figure 11:
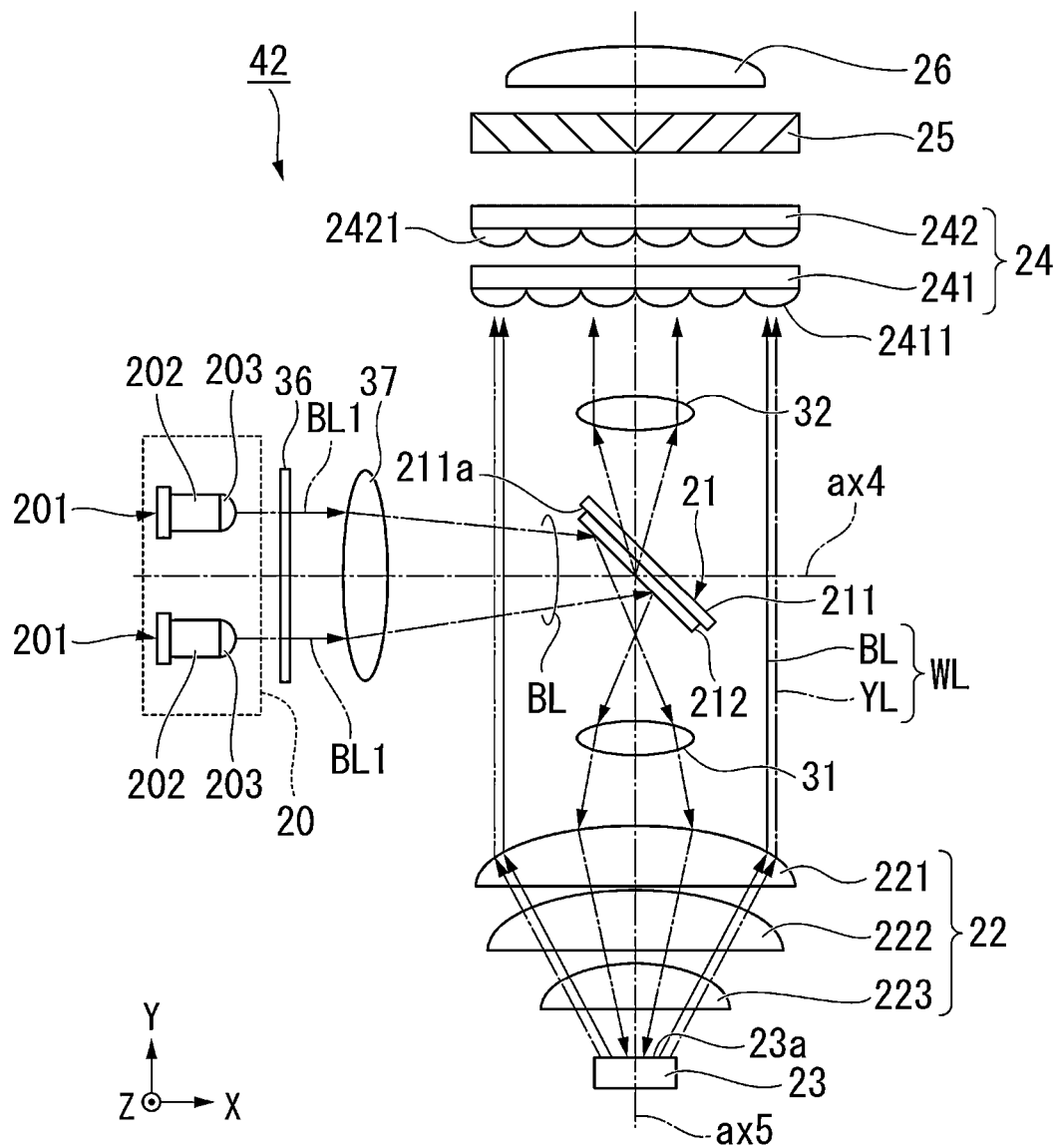
FIG. 11 is a plan view showing a schematic configuration of the illuminator according to a fourth embodiment.

FIG. 11 is a schematic configuration diagram of an illuminator 42 according to the fourth embodiment.

In FIG. 11, components common to those in the figures used in the first embodiment have the same reference characters and will not be described.

The illuminator 42 according to the present embodiment includes the light emitting apparatus 20, the diffuser 36, the focusing lens 37 (first optical system), the optical element 21, the first adjustment lens 31 (second optical system), the focusing pickup system 22 (third optical system), the wavelength converter 23, the second adjustment lens 32 (fourth optical system), the optical integration system 24, the polarization converter 25, and the superimposing lens 26, as shown in FIG. 11.

As in the third embodiment, the diffuser 36 is provided between the light emitting apparatus 20 and the focusing lens 37, diffuses the blue light BL outputted from the light emitting apparatus 20, and causes the diffused blue light BL to exit toward the focusing lens 37. The diffuser 36 lowers the peak value of the illuminance of the blue light BL on the wavelength converter 23. In the present embodiment, the diffuser 36 only needs to be provided between the light emitting apparatus 20 and the optical element 21 and may be provided, for example, between the focusing lens 37 and the optical element 21.

The focusing lens 37 has a focal point located between the optical element 21 and the first adjustment lens 31, as in the second embodiment. Therefore, the blue light BL is defocused by the focusing lens 37 on the optical element 21 and is focused at the focal point on the optical path between the optical element 21 and the first adjustment lens 31.

The other configurations of the illuminator 42 are the same as those of the illuminator 2 according to the first embodiment.

Effects of Fourth Embodiment

The present embodiment also provides the same effects as those provided by the first embodiment, for example, an illuminator 42 that excels in the efficiency of utilization of the blue light BL and the fluorescence YL can be achieved.

Further, the illuminator 42 according to the present embodiment has the configuration in which the blue light BL is incident in the form of defocused light on the wavelength converter 23 and further includes the diffuser 36, which diffuses the blue light BL.

According to the configuration described above, the effect provided by the defocusing described in the second embodiment and the effect provided by the diffuser 36 described in the third embodiment can further lower the peak value of the illuminance of the blue light BL at the wavelength converter 23. An increase in local temperature of the wavelength converter 23 can thus be suppressed, whereby the wavelength conversion efficiency and the reliability of the wavelength converter 23 can be improved.

To demonstrate the effect provided by the diffuser in the illuminator 42 according to the present embodiment, the present inventor conducted a simulation of the illuminance distribution on the wavelength converter 23, as in the third embodiment.

Example 3

As the condition under which the illuminator according to Example 3 was simulated, the angle of diffusion achieved by the diffuser was set at 6°, the radius of curvature of the focusing lens was set at 12 mm, and the radius of curvature of the first adjustment lens was set at 5 mm.

Figure 12:
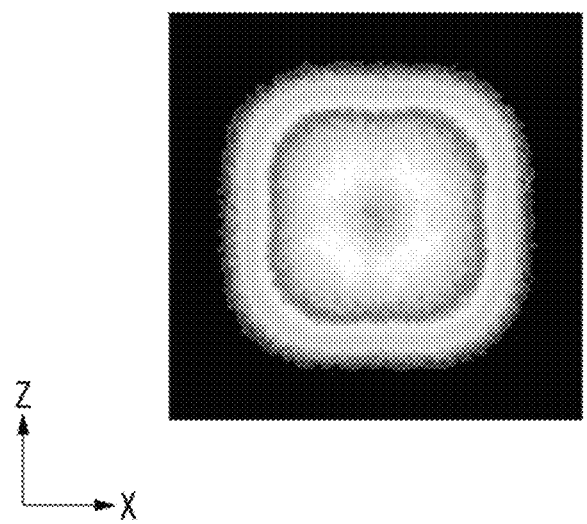
FIG. 12 shows the illuminance distribution on the wavelength converter of the illuminator according to the fourth embodiment.

FIG. 12 shows a simulation result showing the illuminance distribution of the blue light on the wavelength converter viewed in the direction in which the blue light is incident.

The illuminator according to Example 3, in which the blue light is defocused on the wavelength converter and diffused by the diffuser, provides an illuminance distribution that greatly spreads in a square shape having rounded corners and formed around the optical axis of the blue light, as shown in FIG. 12.

Figure 13:
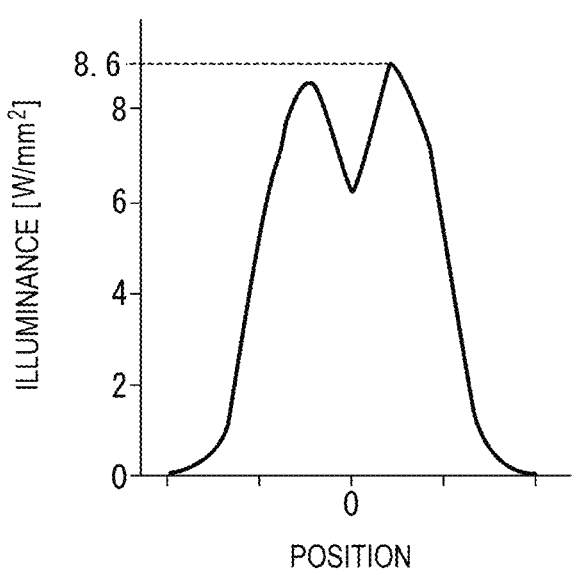
FIG. 13 shows the illuminance distribution in FIG. 12 in the form of a graph.

FIG. 13 shows the illuminance distribution in FIG. 12 in the form of a graph.

The illuminator according to Example 3 allows the maximum illuminance of the blue light BL to be about 8.6 $W/mm^2$, as shown in FIG. 13. The illuminance distribution has two peaks and a small valley in the vicinity of the optical axis of the blue light.

Example 4

Thereafter, as the condition under which the illuminator according to Example 4 was simulated, the angle of diffusion achieved by the diffuser was set at 6°, the radius of curvature of the focusing lens was set at 10 mm, and the radius of curvature of the first adjustment lens was set at 5 mm.

Figure 14:
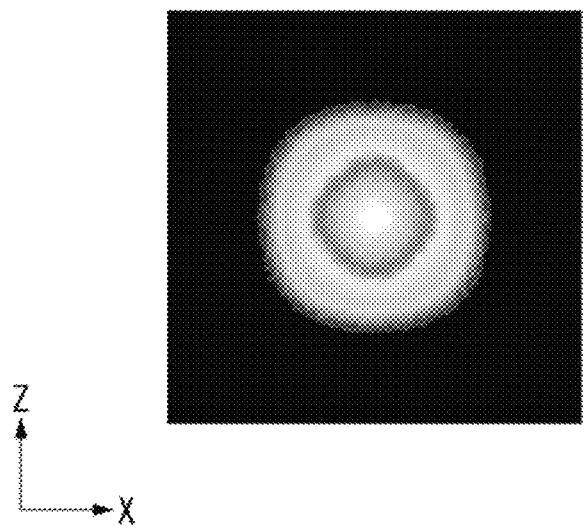
FIG. 14 shows the illuminance distribution on the wavelength converter in the illuminator according to a first variation of the fourth embodiment.

FIG. 14 shows a simulation result showing the illuminance distribution of the blue light on the wavelength converter viewed in the direction in which the blue light is incident.

The illuminator according to Example 4, in which the blue light is defocused on the wavelength converter and diffused by the diffuser, provides an illuminance distribution that spreads in a circular shape around the optical axis of the blue light, as shown in FIG. 14. The degree of the spread of the illuminance distribution is smaller than the spread of the illuminance distribution in Example 3 shown in FIG. 12.

Figure 15:
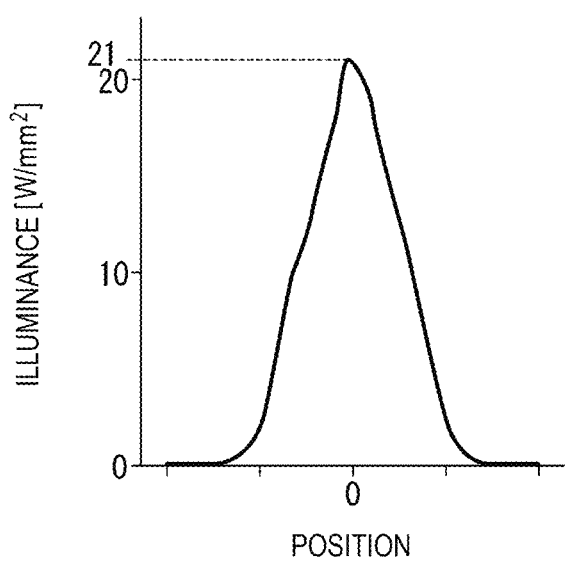
FIG. 15 shows the illuminance distribution in FIG. 14 in the form of a graph.

FIG. 15 shows the illuminance distribution in FIG. 14 in the form of a graph.

The illuminator according to Example 4 allows the maximum illuminance of the blue light to be about 21 $W/mm^2$, as shown in FIG. 15. The maximum illuminance is greater than the maximum illuminance in Example 3, and the illuminance distribution has one peak.

Example 5

Thereafter, as the condition under which the illuminator according to Example 5 was simulated, the angle of diffusion achieved by the diffuser was set at 6°, the radius of curvature of the focusing lens was set at 10 mm, and the radius of curvature of the first adjustment lens was set at 7 mm.

Figure 16:
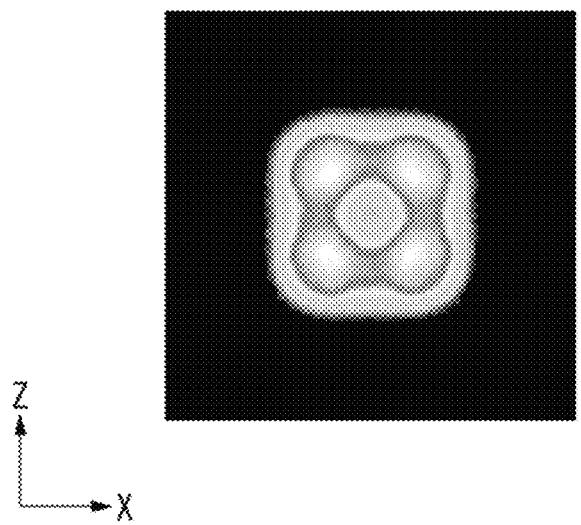
FIG. 16 shows the illuminance distribution on the wavelength converter in the illuminator according to a second variation of the fourth embodiment.

FIG. 16 shows a simulation result showing the illuminance distribution of the blue light on the wavelength converter viewed in the direction in which the blue light is incident.

The illuminator according to Example 5, in which the blue light is defocused on the wavelength converter and diffused by the diffuser, provides an illuminance distribution that spreads in a square shape having rounded corners and formed around the optical axis of the blue light, as shown in FIG. 16. The degree of the spread of the illuminance distribution is smaller than the spread of the illuminance distribution in Example 3 shown in FIG. 12.

Figure 17:
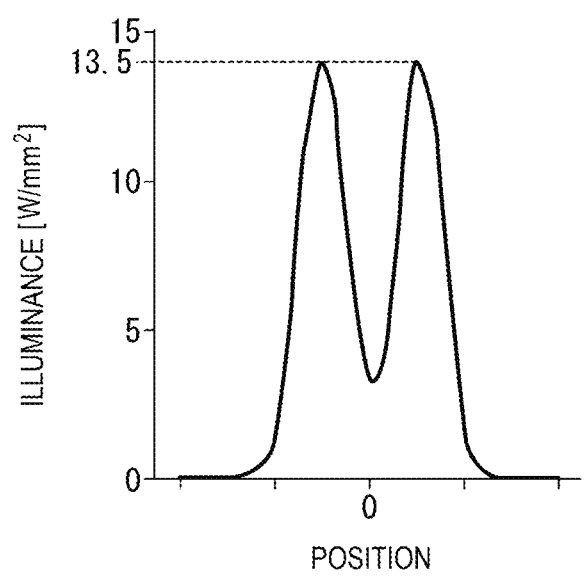
FIG. 17 shows the illuminance distribution in FIG. 16 in the form of a graph.

FIG. 17 shows the illuminance distribution in FIG. 16 in the form of a graph.

The illuminator according to Example 5 allows the maximum illuminance of the blue light to be about 13.5 $W/mm^2$, as shown in FIG. 17. The maximum illuminance is greater than the maximum illuminance in Example 3.

As can be seen from the simulations in Examples 3 to 5 described above, the illuminator 42 according to the fourth embodiment demonstrated that the peak value of the illuminance of the blue light BL at the wavelength converter 23 can be lowered as compared with the peak value in the illuminator 2 according to the first embodiment including no diffuser 36. Further, the simulations show that the illuminance distribution of the blue light BL can be adjusted by changing the radius of curvature of at least one of the focusing lens 37 and the first adjustment lens 31 to adjust the defocus state on the wavelength converter 23.

Fifth Embodiment

A fifth embodiment of the present disclosure will be described below with reference to FIG. 18.

The configuration of the projector according to the fifth embodiment is the same as that in the first embodiment but differs therefrom in terms of the configuration of the illuminator. The overall configurations of the projector and the illuminator will therefore not be described.

Figure 18:
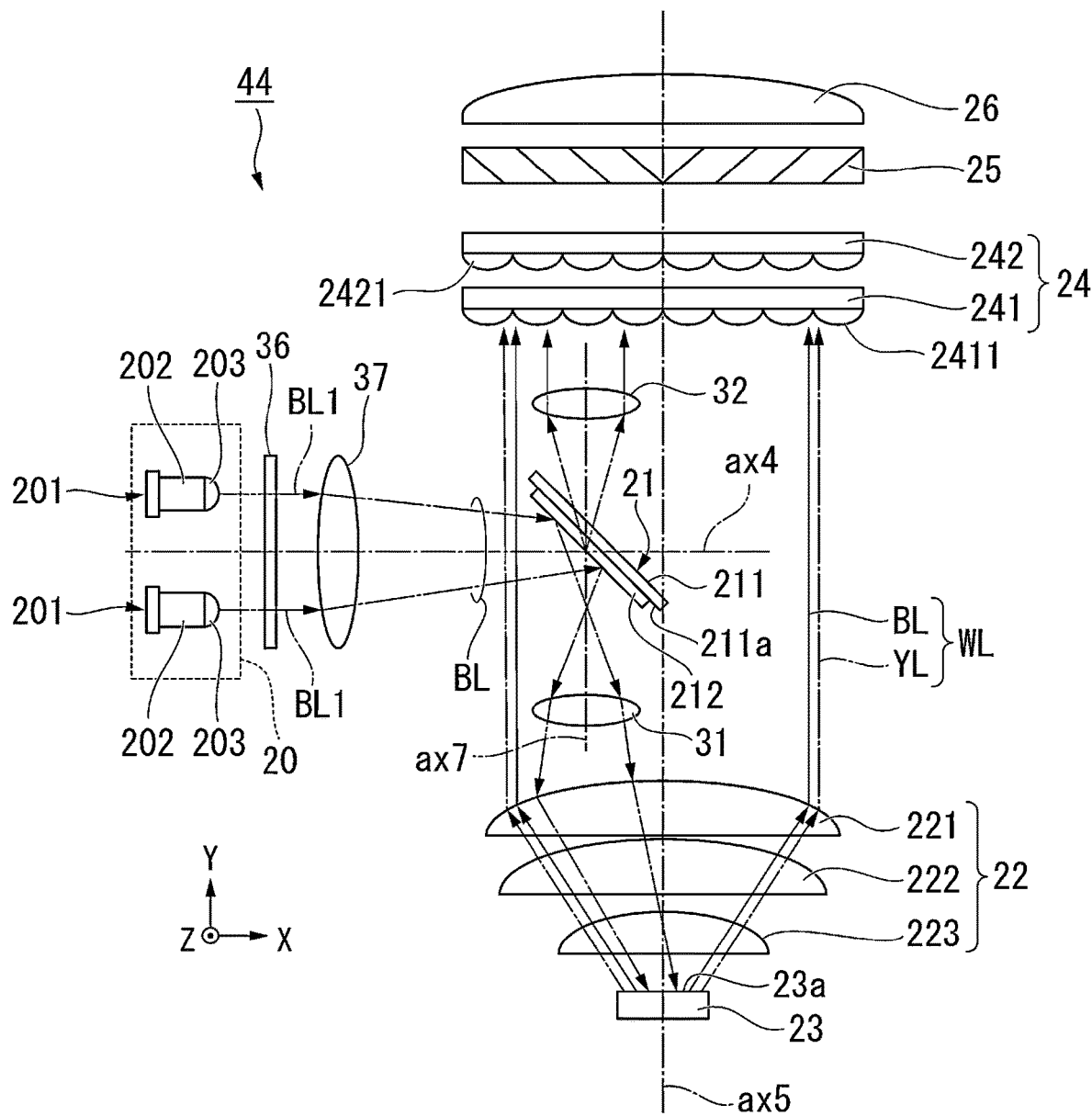
FIG. 18 is a plan view showing a schematic configuration of the illuminator according to a fifth embodiment.

FIG. 18 is a schematic configuration diagram of an illuminator 44 according to the fifth embodiment.

In FIG. 18, components common to those in the figures used in the first embodiment have the same reference characters and will not be described.

The illuminator 44 according to the present embodiment includes the light emitting apparatus 20, the diffuser 36, the focusing lens 37 (first optical system), the optical element 21, and the first adjustment lens 31 (second optical system), the focusing pickup system 22 (third optical system), the wavelength converter 23, the second adjustment lens 32 (fourth optical system), the optical integration system 24, the polarization converter 25, and the superimposing lens 26, as shown in FIG. 18.

The diffuser 36 is provided between the light emitting apparatus 20 and the focusing lens 37, diffuses the blue light BL outputted from the light emitting apparatus 20, and causes the diffused blue light BL to exit toward the focusing lens 37, as in the fourth embodiment. The diffuser 36 lowers the peak value of the illuminance of the blue light BL on the wavelength converter 23. Also in the present embodiment, the diffuser 36 only needs to be provided between the light emitting apparatus 20 and the optical element 21 and may be provided, for example, between the focusing lens 37 and the optical element 21.

The focusing lens 37 has a focal point located between the optical element 21 and the first adjustment lens 31, as in the fourth embodiment. Therefore, the blue light BL is defocused by the focusing lens 37 on the optical element 21 and is focused at the focal point on the optical path between the optical element 21 and the first adjustment lens 31.

In the illuminators 2, 28, 40, and 42 according to the first to fourth embodiments, the optical element 21 is provided at the intersection of the optical axis ax4 of the light emitting apparatus 20 and the optical axis ax5 of the wavelength converter 23. In contrast, in the illuminator 44 according to the present embodiment, the optical element 21 is not provided at the intersection of the optical axis ax4 of the light emitting apparatus 20 and the optical axis ax5 of the wavelength converter 23.

The optical element 21 is provided on the optical axis ax4 of the light emitting apparatus 20 in a position separate from the intersection of the optical axis ax4 of the light emitting apparatus 20 and the optical axis ax5 of the wavelength converter 23. In the present embodiment, the optical element 21 is provided on the optical axis ax4 of the light emitting apparatus 20 in a position shifted toward the light emitting apparatus 20 from the intersection of the optical axis ax4 of the light emitting apparatus 20 and the optical axis ax5 of the wavelength converter 23. Let ax7 be the optical axis passing through the center of the optical element 21 and parallel to the optical axis ax5, and the optical axis ax7 is shifted toward the light emitting apparatus from the optical axis ax5. The optical element 21 may instead be provided on the optical axis ax4 of the light emitting apparatus 20 in a position shifted away from the light emitting apparatus 20 relative to the intersection of the optical axis ax4 of the light emitting apparatus 20 and the optical axis ax5 of the wavelength converter 23.

The other configurations of the illuminator 44 are the same as those of the illuminator according to the first embodiment.

Effects of Fifth Embodiment

The present embodiment also provides the same effects as those provided by the first embodiment, for example, an illuminator 44 that excels in the efficiency of utilization of the blue light BL and the fluorescence YL can be achieved.

Further, the illuminator 44 according to the present embodiment has the configuration in which the blue light BL is incident in the form of defocused light on the wavelength converter 23 and further includes the diffuser 36, which diffuses the blue light BL.

According to the configuration described above, the peak value of the illuminance distribution of the blue light BL at the wavelength converter 23 can be further lowered, as in the fourth embodiment. An increase in local temperature of the wavelength converter 23 can thus be suppressed, whereby the wavelength conversion efficiency and the reliability of the wavelength converter 23 can be improved.

Sixth Embodiment

A sixth embodiment of the present disclosure will be described below with reference to FIG. 19.

The configuration of the projector according to the sixth embodiment is the same as that in the first embodiment but differs therefrom in terms of the configuration of the illuminator. The overall configuration of the projector is therefore not described.

Figure 19:
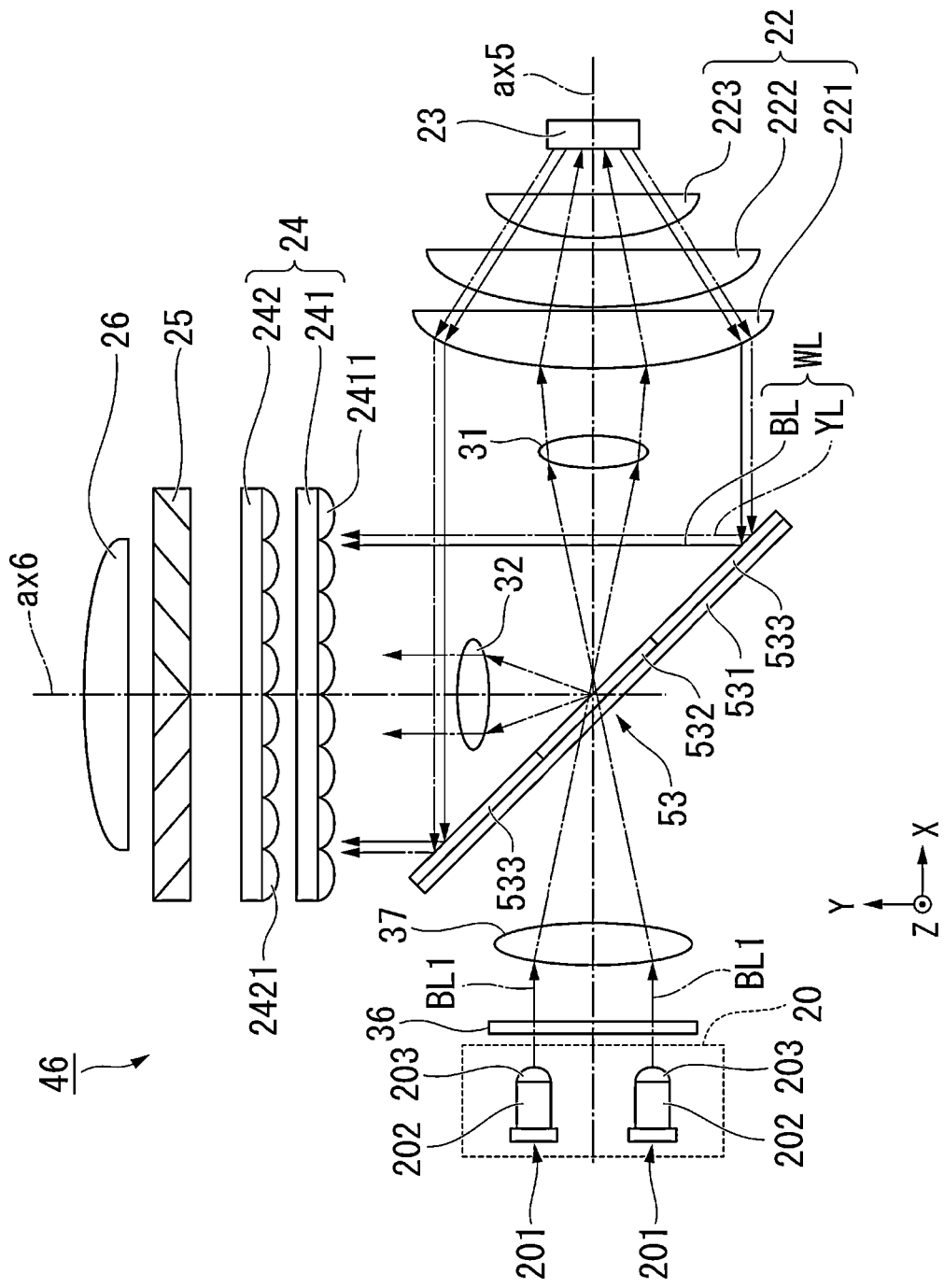
FIG. 19 is a plan view showing a schematic configuration of the illuminator according to a sixth embodiment.

FIG. 19 is a schematic configuration diagram of an illuminator 46 according to the sixth embodiment.

In FIG. 19, components common to those in the figures used in the first embodiment have the same reference characters and will not be described.

The illuminator 46 according to the present embodiment includes the light emitting apparatus 20, the diffuser 36, the focusing lens 37 (first optical system), an optical element 53, the first adjustment lens 31 (second optical system), the focusing pickup system 22 (third optical system), the wavelength converter 23, the second adjustment lens 32 (fourth optical system), the optical integration system 24, the polarization converter 25, and the superimposing lens 26, as shown in FIG. 19.

In the illuminators 2, 28, 40, 42, and 44 according to the first to fifth embodiments, the optical axis ax4 of the light emitting apparatus 20 and the optical axis ax5 of the wavelength converter 23 are perpendicular to each other. In contrast, in the illuminator 46 according to the present embodiment, the optical axis ax4 of the light emitting apparatus 20 and the optical axis ax5 of the wavelength converter 23 are disposed along the same straight line. The light emitting apparatus 20, the diffuser 36, the focusing lens 37, the optical element 53, the first adjustment lens 31, the focusing pickup system. 22, and the wavelength converter 23 are therefore arranged along the same optical axis in the present embodiment. Further, the optical axes ax4 and ax5 are perpendicular to an optical axis ax6 of a downstream optical system including the second adjustment lens 32, the optical integration system 24, the polarization converter 25, and the superimposing lens 26.

The optical element 53 is so disposed as to incline by 45° with respect to each of the optical axes ax4, ax5, and ax6. The optical element 53 includes a light transmissive substrate 531, a dichroic mirror 532 provided in a first area of the light transmissive substrate 531, and a mirror 533 provided in a second area of the light transmissive substrate 531 that is an area different from the first area.

The dichroic mirror 532 is provided in a central area of the light transmissive substrate 531 as the first area where the optical axis ax4 and the optical axis ax5 intersect the optical axis ax6. The dichroic mirror 532 transmits the blue light BL and reflects the yellow fluorescence YL. That is, the transmission wavelength band and the reflection wavelength band of the dichroic mirror 532 in the present embodiment and the transmission wavelength band and the reflective wavelength band of the dichroic mirror 212 in the first embodiment are reversed in terms of characteristics from each other.

The mirror 533 is provided in a peripheral area of the light transmissive substrate 531 as the second area that is an area on opposite sides of the dichroic mirror 532. The mirror 533 reflects both the blue light BL and the fluorescence YL. The mirror 533 is formed, for example, of a dielectric multilayer film or a metal film.

In the present embodiment, the blue light BL outputted from the light emitting apparatus 20 passes through the dichroic mirror 532 via the diffuser 36 and the focusing lens 37 and enters the wavelength converter 23 via the first adjustment lens 31 and the focusing pickup system 22. Also in the present embodiment, the focusing lens 37 is provided between the light emitting apparatus 20 and the optical element 53, whereby the size of the dichroic mirror 532 on the optical element 53 can be reduced, as in the first embodiment.

When the size of the dichroic mirror 532 is reduced, a central portion of the blue light BL having exited out of the wavelength converter 23 is incident on the dichroic mirror 532, but a peripheral portion of the blue light BL is reflected off the mirror 533 provided on opposite sides of the dichroic mirror 532. The blue light BL incident on the dichroic mirror 532 passes through the dichroic mirror 532 and is therefore lost, but the blue light BL incident on the mirror 533 along with the fluorescence YL is used as the illumination light WL. Further, reducing the size of the dichroic mirror 532 can reduce the amount of loss of the blue light BL passing through the dichroic mirror 532.

The effects of the first adjustment lens 31 and the second adjustment lens 32 are the same as the effects provided by the illuminators 2, 28, 40, 42, 44 according to the first to fifth embodiments. That is, changing the curvature of the first adjustment lens 31 allows adjustment of the illuminance distribution of the blue light BL on the wavelength converter 23. Further, providing the second adjustment lens 32 allows reduction in the amount of fluorescence YL that cannot enter the optical system on the downstream of the second adjustment lens 32.

Effects of Sixth Embodiment

The present embodiment also provides the same effects as those provided by the first embodiment, for example, an illuminator 46 that excels in the efficiency of utilization of the blue light BL and the fluorescence YL can be achieved.

Further, the illuminator 46 according to the present embodiment has the configuration in which the blue light BL is incident in the form of defocused light on the wavelength converter 23 and further includes the diffuser 36, which diffuses the blue light BL.

According to the configuration described above, the peak value of the illuminance of the blue light BL at the wavelength converter 23 can be further lowered. An increase in local temperature of the wavelength converter 23 can thus be suppressed, whereby the wavelength conversion efficiency and the reliability of the wavelength converter 23 can be improved.

The technical scope of the present disclosure is not limited to those in the embodiments described above, and a variety of changes can be made thereto to the extent that the changes do not depart from the substance of the present disclosure.

For example, in the illuminators according to the embodiments described above, the curvature and focal length of the second adjustment lens coincide with the curvature and focal length of the first adjustment lens, and the second adjustment lens parallelizes the fluorescence YL that enters the second adjustment lens. In place of the configuration described above, the curvature and focal length of the second adjustment lens may not coincide with the curvature and focal length of the first adjustment lens. In this configuration, the second adjustment lens causes the fluorescence YL having exited out of the optical element to exit and reduces the angle of divergence of the fluorescence YL after exiting out of the second adjustment lens as compared with the angle of divergence of the fluorescence YL before entering the second adjustment lens. Even in this case, the second adjustment lens can reduce the amount of fluorescence YL that cannot be used in the optical system on the downstream of the second adjustment lens to contribute to the improvement in the efficiency of utilization of the fluorescence YL.

Further, the above embodiments have been described with reference to an immobile wavelength converter configured not to be rotatable, and the present disclosure is also applicable to an illuminator including a wavelength converter configured to be rotatable by a motor. An immobile diffuser configured not to be rotatable has also been presented, and the present disclosure is also applicable to an illuminator including a diffuser configured to be rotatable by a motor.

In addition to the above, the specific descriptions of the shape, the number, the arrangement, the material, and other factors of the components of the illuminators and the projectors are not limited to those in the embodiments described above and can be changed as appropriate. The above embodiments have been described with reference to the case where the illuminators according to the present disclosure are each incorporated in a projector using liquid crystal light valves, but not necessarily. The illuminators according to the present disclosure may each be incorporated in a projector using a digital micromirror device as each of the light modulators. The projectors may not each include a plurality of light modulators and may instead include only one light modulator.

The embodiments have been described with reference to the case where the illuminators according to the present disclosure are each incorporated in a projector, but not necessarily. The illuminators according to the present disclosure may each be used as a lighting apparatus, a headlight of an automobile, and other components.

An illuminator according to an aspect of the present disclosure may have the configuration below.

An illuminator according to an aspect of the present disclosure includes a light emitting apparatus which outputs first light that belongs to a first wavelength band, a wavelength converter which converts part of the first light into second light that belongs to a second wavelength band different from the first wavelength band and causes the second light and another part of the first light to exit, a first optical system which has positive power and which the first light enters, an optical element which the first light that exits out of the first optical system enters and which reflects one of the first light and the second light and transmits the other, a second optical system which has positive power and which the first light that exits out of the optical element and the second light emitted from the wavelength converter enter, a third optical system which has positive power and causes the first light that exits out of the second optical system to enter the wavelength converter, and a fourth optical system which has positive power and which the second light that exits out of the second optical system enters.

In the illuminator according to the aspect of the present disclosure, the first optical system may be provided between the light emitting apparatus and the optical element, have a focal point on the optical element or between the optical element and the second optical system, and focus the first light outputted from the light emitting apparatus.

In the illuminator according to the aspect of the present disclosure, the second optical system may cause the first light that exits out of the optical element to exit toward the third optical system and reduce the angle of divergence of the first light after exiting out of the second optical system as compared with the angle of divergence of the first light before entering the second optical system or parallelize the first light.

In the illuminator according to the aspect of the present disclosure, the third optical system may be provided between the second optical system and the wavelength converter.

In the illuminator according to the aspect of the present disclosure, the fourth optical system may cause the second light that exits out of the optical element to exit and reduce the angle of divergence of the second light after exiting out of the fourth optical system as compared with the angle of divergence of the second light before entering the fourth optical system or parallelize the second light.

The illuminator according to the aspect of the present disclosure may further include a diffuser that is provided between the light emitting apparatus and the optical element and diffuses the first light.

In the illuminator according to the aspect of the present disclosure, the first light may be incident in the form of defocused light on the wavelength converter.

In the illuminator according to the aspect of the present disclosure, the optical element may include a light transmissive substrate and a dichroic mirror that is provided at the light transmissive substrate, reflects the first light, and transmits the second light.

In the illuminator according to the aspect of the present disclosure, the optical element may include a light transmissive substrate, a dichroic mirror that is provided in a first area of the light transmissive substrate, transmits the first light, and reflects the second light, and a mirror that is provided in a second area of the light transmissive substrate that is an area different from the first area and reflects the first light and the second light.

In the illuminator according to the aspect of the present disclosure, the optical element may be provided on the optical axis of the light emitting apparatus in a position separate from the intersection of the optical axis of the light emitting apparatus and the optical axis of the wavelength converter.

In the illuminator according to the aspect of the present disclosure, the wavelength converter may include a wavelength conversion layer that converts the first light into the second light, a reflection layer provided at a first surface of the wavelength conversion layer, and a structural element provided at a second surface of the wavelength conversion layer that is a surface different from the first surface.

A projector according to another aspect of the present disclosure may have the configuration below.

The projector according to the other aspect of the present disclosure includes the illuminator according to the aspect of the present disclosure, a light modulator that modulates light from the illuminator in accordance with image information, and a projection optical apparatus that projects the light modulated by the light modulator.

What is claimed is:

1. An illuminator comprising:
    a light emitting apparatus which outputs first light that belongs to a first wavelength band;
    a wavelength converter which converts part of the first light into second light that belongs to a second wavelength band different from the first wavelength band and causes the second light and another part of the first light to exit;
    a first optical system which has positive power and which the first light enters;
    an optical element which the first light that exits out of the first optical system enters and which reflects one of the first light and the second light and transmits another of the first light and the second light;
    a second optical system which has positive power and which the first light that exits out of the optical element and the second light emitted from the wavelength converter enter;
    a third optical system which has positive power and causes the first light that exits out of the second optical system to enter the wavelength converter; and
    a fourth optical system which has positive power and which the second light that exits out of the second optical system enters, wherein
    a first distance between a first principal point of the second optical system and a center of the optical element coincides with a second distance between a second principal point of the fourth optical system and the center of the optical element.

2. The illuminator according to claim 1, wherein the first optical system is provided between the light emitting apparatus and the optical element, has a focal point on the optical element or between the optical element and the second optical system, and focuses the first light outputted from the light emitting apparatus.

3. The illuminator according to claim 1, wherein the second optical system causes the first light that exits out of the optical element to exit toward the third optical system and reduces an angle of divergence of the first light after exiting out of the second optical system as compared with an angle of divergence of the first light before entering the second optical system or parallelizes the first light.

4. The illuminator according to claim 1, wherein the third optical system is provided between the second optical system and the wavelength converter.

5. The illuminator according to claim 1, wherein the fourth optical system causes the second light that exits out of the optical element to exit and reduces an angle of divergence of the second light after exiting out of the fourth optical system as compared with an angle of divergence of the second light before entering the fourth optical system or parallelizes the second light.

6. The illuminator according to claim 1 further comprises a diffuser that is provided between the light emitting apparatus and the optical element and diffuses the first light.

7. The illuminator according to claim 1, wherein the first light is incident in a form of defocused light on the wavelength converter.

8. The illuminator according to claim 1,
    wherein the optical element includes
    a light transmissive substrate; and
    a dichroic mirror that is provided at the light transmissive substrate, reflects the first light, and transmits the second light.

9. The illuminator according to claim 1,
    wherein the optical element includes
    a light transmissive substrate;
    a dichroic mirror that is provided in a first area of the light transmissive substrate, transmits the first light, and reflects the second light; and
    a mirror that is provided in a second area of the light transmissive substrate that is an area different from the first area and reflects the first light and the second light.

10. The illuminator according to claim 1, wherein the optical element is provided on an optical axis of the light emitting apparatus in a position separate from an intersection of the optical axis of the light emitting apparatus and an optical axis of the wavelength converter.

11. The illuminator according to claim 1,
    wherein the wavelength converter includes a wavelength conversion layer that converts the first light into the second light;

a reflection layer provided at a first surface of the wavelength conversion layer; and a structural element provided at a second surface of the wavelength conversion layer that is a surface different from the first surface.

12. A projector comprising:

the illuminator according to claim 1;

a light modulator that modulates light from the illuminator in accordance with image information; and a projection optical apparatus that projects the light modulated by the light modulator.

13. An illuminator comprising:

a light emitting apparatus which outputs first light that belongs to a first wavelength band;

a wavelength converter which converts part of the first light into second light that belongs to a second wavelength band different from the first wavelength band and causes the second light and another part of the first light to exit;

a first optical system which has positive power and which the first light enters;

an optical element which the first light that exits out of the first optical system enters and which reflects one of the first light and the second light and transmits another of the first light and the second light;

a second optical system which has positive power and which the first light that exits out of the optical element and the second light emitted from the wavelength converter enter;

a third optical system which has positive power and causes the first light that exits out of the second optical system to enter the wavelength converter; and a fourth optical system which has positive power and which the second light that exits out of the second optical system enters, wherein the second optical system includes a first lens, the fourth optical system includes a second lens, and a curvature of the first lens is equal to a curvature of the second lens.

14. An illuminator comprising:

a light emitting apparatus which outputs first light that belongs to a first wavelength band;

a wavelength converter which converts part of the first light into second light that belongs to a second wavelength band different from the first wavelength band and causes the second light and another part of the first light to exit;

a first optical system which has positive power and which the first light enters;

an optical element which the first light that exits out of the first optical system enters and which reflects one of the first light and the second light and transmits another of the first light and the second light;

a second optical system which has positive power and which the first light that exits out of the optical element and the second light emitted from the wavelength converter enter;

a third optical system which includes three convex lenses and which has positive power and causes the first light that exits out of the second optical system to enter the wavelength converter; and a fourth optical system which has positive power and which the second light that exits out of the second optical system enters.

* * * * *